(12) United States Patent
Tomoda et al.

(10) Patent No.: US 7,031,659 B2
(45) Date of Patent: Apr. 18, 2006

(54) COMMUNICATION SYSTEM, COMMUNICATION DEVICE, AND COMMUNICATION METHOD

(75) Inventors: Masaaki Tomoda, Suita (JP); Toshihiko Kurosaki, Koube (JP); Takeshi Hatakeyama, Neyagawa (JP); Teruaki Ata, Ibaraki (JP); Ken-ichi Moriguchi, Neyagawa (JP); Tsuyoshi Kindo, Sennangun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 678 days.

(21) Appl. No.: 10/153,662

(22) Filed: May 24, 2002

(65) Prior Publication Data
US 2002/0177472 A1 Nov. 28, 2002

(30) Foreign Application Priority Data
May 28, 2001 (JP) .............................. 2001-158669
Aug. 6, 2001 (JP) .............................. 2001-237399

(51) Int. Cl.
*H04B 7/00* (2006.01)

(52) U.S. Cl. ..................... 455/41.2; 455/41.1; 455/41.3

(58) Field of Classification Search ................ 455/569, 455/41.1, 41.2, 41.3
See application file for complete search history.

(56) References Cited

U.S. PATENT DOCUMENTS

| 5,608,780 A | * | 3/1997 | Gerszberg et al. | .......... 455/436 |
| 6,633,759 B1 | * | 10/2003 | Kobayashi | .................. 455/419 |
| 6,697,638 B1 | * | 2/2004 | Larsson et al. | .......... 455/553.1 |

FOREIGN PATENT DOCUMENTS

| EP | 1 052 834 | 11/2000 |
| JP | 2001-144767 | 5/2001 |
| WO | 96 32783 | 10/1996 |

OTHER PUBLICATIONS

Bluetooth Sig Inc.:"Specification version 1.1" Bluetooth, :online!, Feb. 22, 2001, p. 1-392.

* cited by examiner

*Primary Examiner*—Nay Maung
*Assistant Examiner*—Angelica Perez
(74) *Attorney, Agent, or Firm*—Wenderoth, Lind & Ponack, L.L.P.

(57) ABSTRACT

A hands-free device includes a communication unit that obtains a Media Access Control (MAC) address of a portable terminal device from the portable terminal device, and an address storing unit that registers one of the MAC addresses that is obtained by the communication unit into the address storing unit itself in response to a registration trigger signal. The hands-free device also includes a control unit that reads the registered MAC address from the address storing unit and specifies a portable terminal device having the read registered address as a communication target device in response to a search trigger signal.

16 Claims, 35 Drawing Sheets

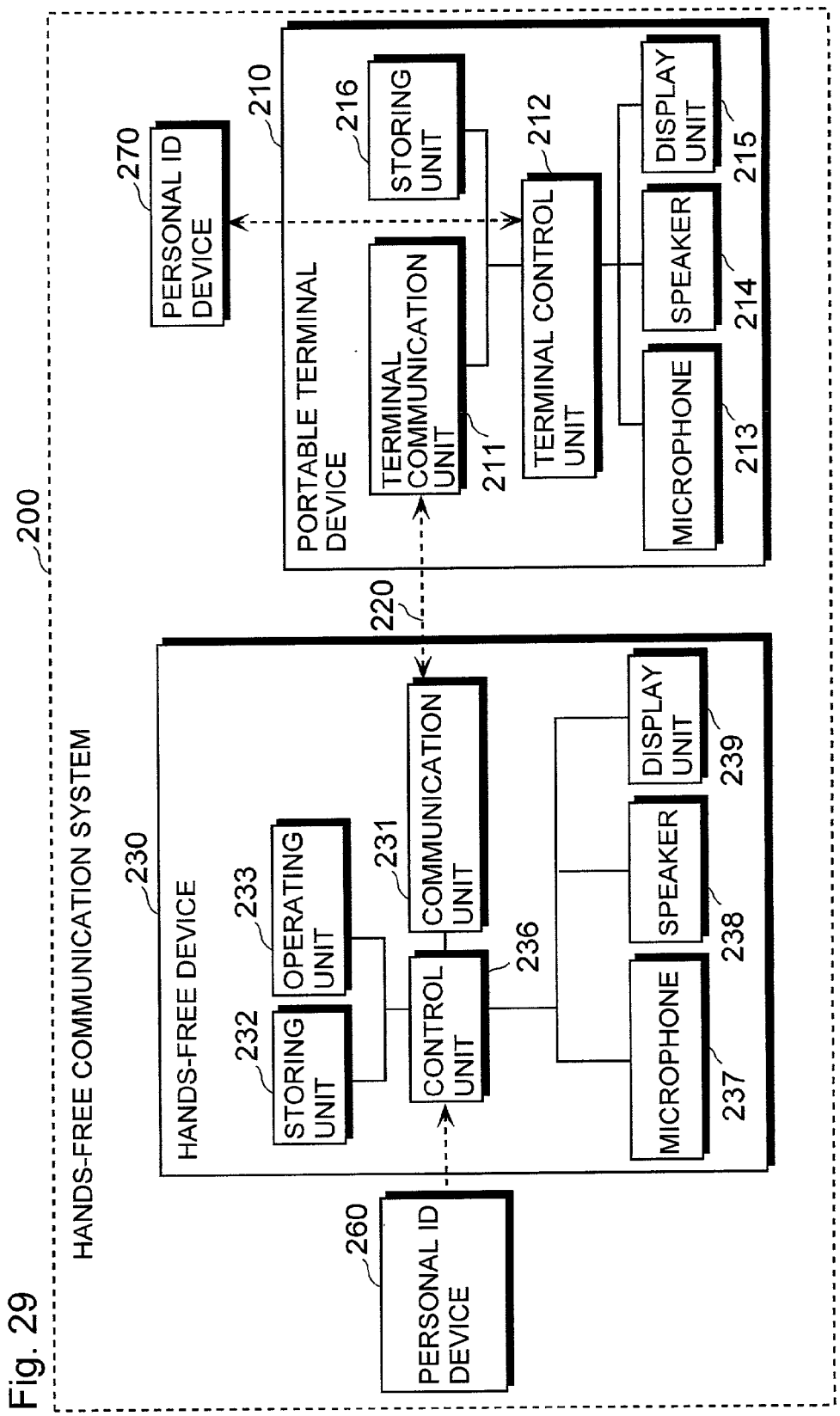

Fig. 30

| PERSONAL ID | MAC ADDRESS | USER INFORMATION | FLAG | PRIORITY |
|---|---|---|---|---|
| 1 | 0x1234567890AB | 090-1234-5678 | EFFECTIVE | 1 |
| 2 | 0x234567890ABC | 090-2345-6789 | | 2 |
| 3 | 0x34567890ABCD | 090-9876-5432 | | 3 |

232 STORING UNIT
232d

Fig. 35

| MAC ADDRESS | USER INFORMATION | ELECTRIC FIELD INTENSITY |
|---|---|---|
| 0x1234567890AB | 090-1234-5678 | E1 |
| 0x234567890ABC | 090-2345-6789 | E2 |
| 0x34567890ABCD | 090-9876-5432 | E3 |

232e

COMMUNICATION SYSTEM, COMMUNICATION DEVICE, AND COMMUNICATION METHOD

BACKGROUND OF THE INVENTION (1) Field of the Invention

The present invention relates to a communication system and a communication device, such as a portable telephone and a hands-free communication device, and to a communication method thereof.

(2) Description of Related Art

The following describes a hands-free communication system as an example of a conventional communication system with reference to drawings.

FIG. 1 is a block diagram showing a conventional hands-free communication system 1000.

This hands-free communication system 1000 comprises a portable terminal device 1010 and a hands-free device 1030. The portable terminal device 1010 is a portable telephone. The hands-free device 1030 is installed in an automobile and conducts communications over a telephone network by communicating with the portable terminal device 1010 that is brought into the automobile.

The portable terminal device 1010 includes the following elements: a terminal interface unit 1011 that functions as an interface for communication via a 16-conductor cable 1020; a microphone 1014 that collects the speech (voices) of a user of the portable terminal device 1010; a speaker 1015 that outputs the speech of the other person to whom the user talks on the portable terminal device 1010; a display unit 1016 that displays a telephone number and the like; and a terminal control unit 1013 that controls the terminal interface unit 1011, the microphone 1014, the speaker 1015, and the display unit 1016.

When this portable terminal device 1010 is set in normal mode and communicates with another telephone via the telephone network, the terminal device 1010 has the microphone 1014, the speaker 1015, and the display unit 1016 operate under the control of the terminal control unit 1013. In this normal mode, the user holds the portable terminal device 1010 in his hand and speaks with the other person who uses another telephone.

The hands-free device 1030 includes the following elements: an interface unit 1031 that functions as an interface for communication via the 16-conductor cable 1020; a microphone 1037 affixed on a rearview mirror of the automobile, for instance, to collect the speech of a driver; a speaker 1038 that outputs the speech of the other person to whom the driver talks through the hands-free device 1030; a display unit 1039 that displays a telephone number and the like; a control unit 1036 that controls the interface unit 1031, the microphone 1037, the speaker 1039, and the display unit 1039; and an input unit 1040 that includes operational buttons and gives an instruction to the control unit 1036 in accordance with operations on the operational buttons.

With this hands-free communication system 1000, the 16-conductor cable 1020 connects the terminal interface unit 1011 of the portable terminal device 1010 with the interface unit 1031 of the hands-free device 1030. In this way, the portable terminal device 1010 is connected to the hands-free device 1030 in a one-to-one relationship.

As soon as the portable terminal device 1010 and the hands-free device 1030 are connected to each other in this way, the portable terminal device 1010 switches its operational mode from the normal mode to the hands-free mode so that the user can speak over the terminal device 1010 without holding it in his hand. Hereafter, such communication is called "hands-free communication".

The following describes an operation which is performed by the conventional hands-free communication system 1000 when the portable terminal device 1010 clears the normal mode and switches, together with the hands-free device 1030, to the hands-free mode.

FIG. 2 is a sequence diagram showing this operation of the hands-free communication system 1000.

As soon as the portable terminal device 1010 and the hands-free device 1030 are connected to each other via the 16-conductor cable 1020 (step S900), the portable terminal device 1010 clears the normal mode and switches to the hands-free mode to perform hands-free communication (step S902). At the same time, the hands-free device 1030 also switches to the hands-free mode (step S904).

Consequently, the hands-free communication system 1000 performs hands-free activation operation that activates the microphone 1037 and the speaker 1038 so that the user can perform the hands-free communication for calling another telephone or receiving a call from another telephone (step S906).

In more detail, when the portable terminal device 1010 receives a call while the terminal device 1010 and the hands-free device 1030 are set in the hands-free mode, the terminal device 1010 notifies the hands-free device 1030 of the reception of the call, so that the control unit 1036 of the hands-free device 1030 has the speaker 1038 output ringing sounds. When the control unit 1036 receives an instruction to answer the telephone from the input unit 1040, the portable terminal device 1010 and the hands-free device 1030 perform the aforementioned hands-free activation operation. This enables the driver (i.e., the user) to hear the speech of the other person on the line through the speaker 1038 and sends his own speech collected by the microphone 1037 to the other person so as to perform the hands-free communication.

On the other hand, when the driver operates the input unit 1040 to request the hands-free device 1030 to make a call while the terminal device 1010 and the hands-free device 1030 are in the hands-free mode, the control unit 1036 of the hands-free device 1030 notifies the portable terminal device 1010 of this request, so that the terminal device 1010 makes the requested telephone call to another telephone. When the telephone call is answered, the hands-free device 1030 and the portable terminal device 1010 perform the hands-free activation operation. As a result, the driver can conduct the hands-free communication.

The conventional hands-free communication system 1000, however, requires the user to perform a troublesome manual operation to connect the portable terminal device 1010 to the hands-free device 1030 with the 16-conductor cable 1020.

In addition, when the hands-free device 1030 and a plurality of the portable terminal devices 1010 are connected to one another with either a bus network or a wireless network with these devices 1030 and 1010 within a communicable range, then the hands-free device 1030 cannot specify, out of the plurality of portable terminal devices 1010, a portable terminal device 1010 with which the hands-free device 1030 should establish a communication link.

SUMMARY OF THE INVENTION

In view of the above problems, an object of the present invention is to provide a communication device which is capable of specifying a target communication device and establishing a communication link with the specified target communication device without requiring any troublesome user operation. Another object of the present invention is to provide a communication system and a communication method for which such a communication device is used.

To achieve the above-described objects, the communication system of the present invention includes a plurality of communication devices, each of which communicates with another communication device from among the plurality of communication devices by obtaining an address of the other communication device. A different address is assigned to each communication device. One of the plurality of communication devices includes: an obtaining unit operable to obtain an address of another communication device from the other communication device; a registering unit operable to register one of addresses obtained by the obtaining unit into the registering unit in response to the reception of a first trigger signal; and a specifying unit operable to read the registered address from the registering unit and to specify a communication device as a target communication device in response to the reception of a second trigger signal, where the specified communication device has the read registered address.

With this construction, in response to the first trigger signal, the address of the other communication device is registered in the one of the plurality of the communication devices. In response to the second trigger signal, the one of communication devices specifies, as a target communication device, a communication device whose address it registers. Consequently, the user can have the one of the communication devices specify a target communication device and establish a communication link with the specified target communication device.

The present invention may be also embodied as a communication system that includes a plurality of communication devices, each of which communicates with another communication device from among the plurality of communication devices by obtaining an address of the other communication device. A different address is assigned to each communication device. One of the plurality of communication devices includes: an obtaining unit operable to obtain a set of identification (ID) information which is assigned to a user, and an address of another communication device from the other communication device; a registering unit operable to associate an obtained address with a latest set of ID information that is most recently obtained by the obtaining unit, and to register the obtained address and the latest set of ID information into the registering unit; and a specifying unit operable to search the registering unit for the latest set of ID information and to specify a communication device as a target communication device, where the specified communication device has the address which is associated with the latest set of ID information.

For this construction, an address of another communication device is associated with a latest set of ID information and registered in the one of the plurality of communication devices, which then specifies, as a target communication device, the other communication device having the address which is associated with the latest set of ID information. Consequently, the user can have the one of the plurality of communication devices specify a target communication device and establish a communication link with the specified target communication device. In addition, the one of the plurality of communication devices can select a different target communication device for each user because an address of a target communication device is associated with a latest set of ID information to be registered.

Here, the one of the plurality of communication devices may also include a selecting unit operable to select, in accordance with an operation by a user, one of addresses obtained by the obtaining unit, and the registering unit may register the selected address.

With this construction, the address selected by the selecting unit is registered in the one of the plurality of communication devices. This allows the user to select a desired target communication device to register by operating the selecting unit.

Here, the obtaining unit may also obtain user information from the another communication device. This user information indicates information regarding a user of the other communication device. The one of the plurality of communication devices may also include a display unit operable to display the obtained user information.

With this construction, the display unit displays information regarding users of target communication devices. This allows an operator of the display unit to know information on users of the target communication devices whose addresses have been obtained by the one of the communication devices, so that the operator can select a target communication device of a desired user to register in the one of the communication devices.

The present invention may be also embodied as communication system that includes a plurality of communication devices, each of which performs wireless communication with another communication device from among the plurality of communication devices by obtaining an address of the other communication device. A different address is assigned to each communication device. One of the plurality of communication devices includes: an obtaining unit operable to obtain an address of other communication device from the another communication device through wireless communication; a measuring unit operable to measure an electric field intensity of a wireless signal sent from the other communication device; a registering unit operable to associate the obtained address with an electric field intensity that is measured by the measuring unit when the address is obtained, and to register the address and the electric field intensity which are associated with each other in the registering unit; and a specifying unit operable to search the registering unit for a highest electric field intensity and to specify a communication device as a target communication device, where the specified communication device has an address which is associated with the highest electric field.

The above-described one of the plurality of communication devices specifies, as a target communication device, a communication device that sends a wireless signal of the highest electric field intensity. The user can therefore have the one of the plurality of communication devices specify a target communication device to establish a communication link without performing any troublesome operation. In addition, there is a high probability of the one of the communication devices specifying, as a target communication device, a communication device which is nearest in presence to the one of the communication devices. Accordingly, when the above-described communication system is applied to a hands-free system, a hands-free device (i.e., the one of the plurality of communication devices) can select the most suitable portable terminal device (i.e., another communication device) as a target communication device.

The present invention may be also embodied as a communication system that includes a plurality of communication devices, each of which communicates with another communication device from among the plurality of communication devices by obtaining an address of the other communication device. A different address is assigned to each communication device. One of the plurality of communication devices includes: an obtaining unit operable to obtain an address of another communication device from the other communication device; a registering unit operable to associate the obtained address with a priority and to register the address which is associated with the priority into the registering unit; and a specifying unit operable to specify a communication device as a target communication device, where the specified communication device has an address which is associated with a highest priority out of all of the priorities that are registered in the registering unit.

With this construction, an address of the other communication device is associated with a priority and registered in the one the plurality of communication devices, which then specifies, as its target communication device, a communication device that has a registered address which is associated with the highest priority. Consequently, the user can have the one of the communication devices select a target communication device to establish a communication link without performing any troublesome operation.

The present invention may be also embodied as a communication method which is used for a communication device to specify a target communication device, and as a program to have a computer perform this communication method. Such a program may be recorded on a recording medium such as a CD-ROM (compact disc read-only memory), or distributed via a transmission medium such as a communication network.

BRIEF DESCRIPTION OF THE DRAWINGS

These and the other objects, advantages and features of the present invention will become more apparent from the following detailed description when taken in conjunction with the accompanying drawings which illustrate specific embodiments of the present invention.

FIG. 29 shows a hands-free system that includes a portable terminal device having a function of the hands-free device;

FIG. 30 is a table showing personal registration data that includes priorities for the second embodiment;

FIG. 35 is a table showing field intensity data for the fourth embodiment.

DETAILED DESCRIPTION OF THE PREFERRED EMBODIMENTS

The following specifically describes the present invention based on several embodiments with reference to the drawings.

First Embodiment

The following describes a hands-free communication system according to a first embodiment of the present invention.

Figure 1:
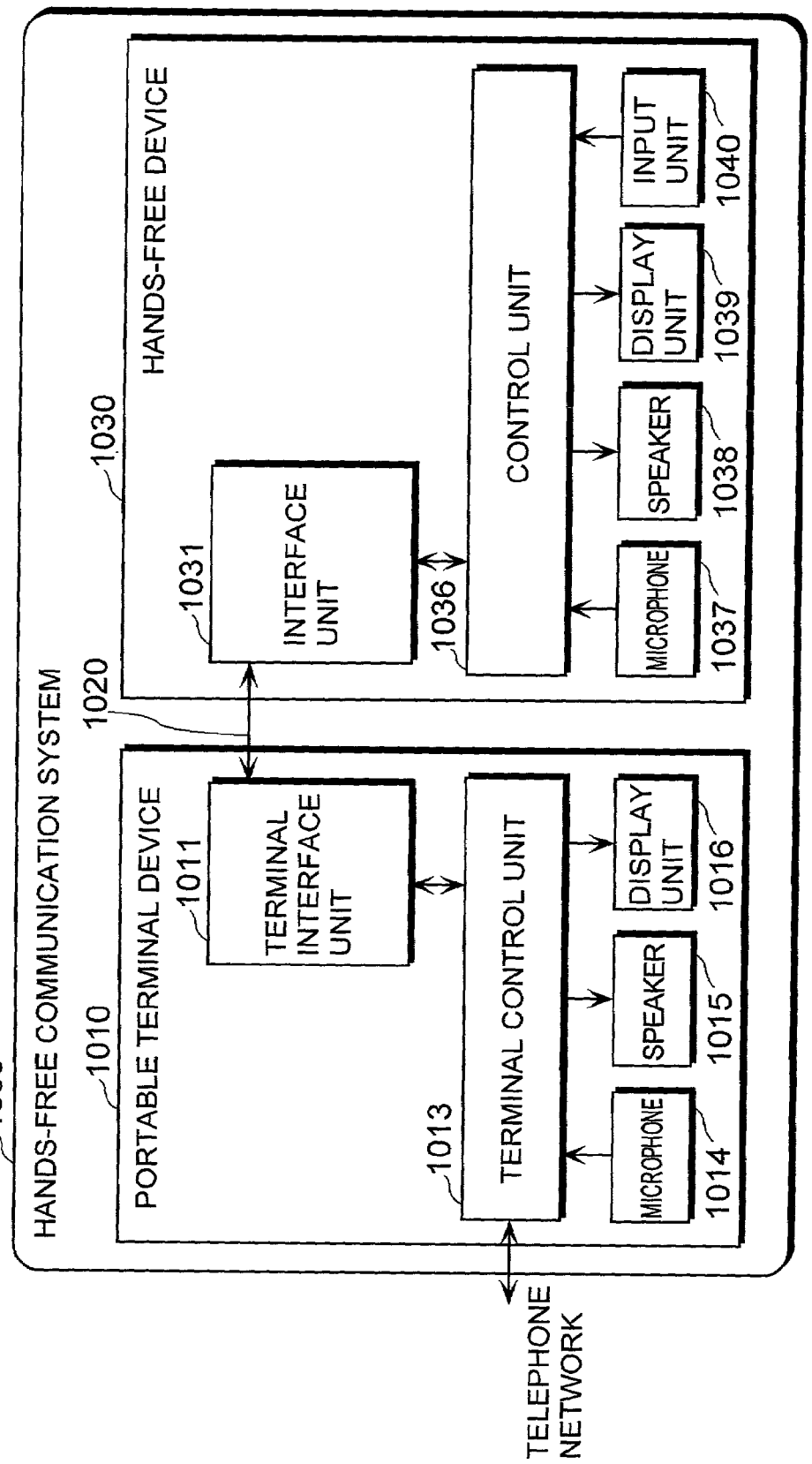
FIG. 1 is a block diagram showing a conventional hands-free communication system.
Figure 2:
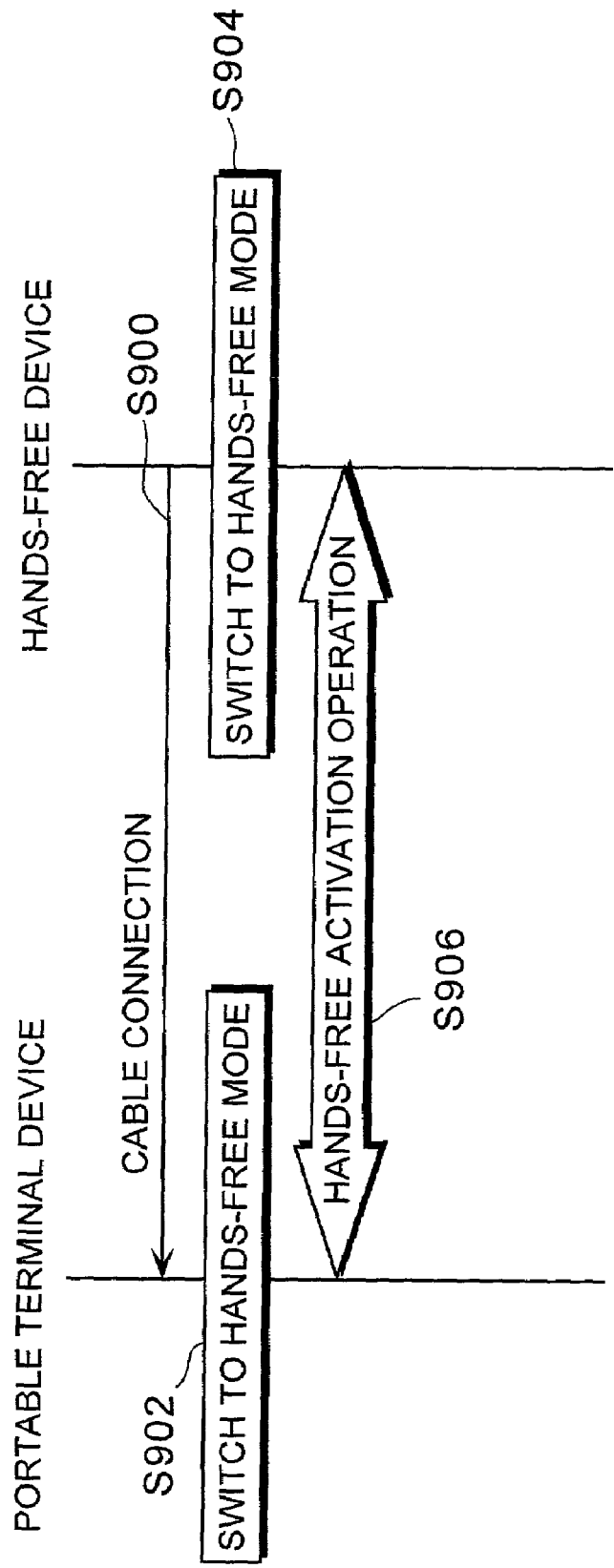
FIG. 2 is a sequence diagram showing an operation of the conventional hands-free communication system.
Figure 3:
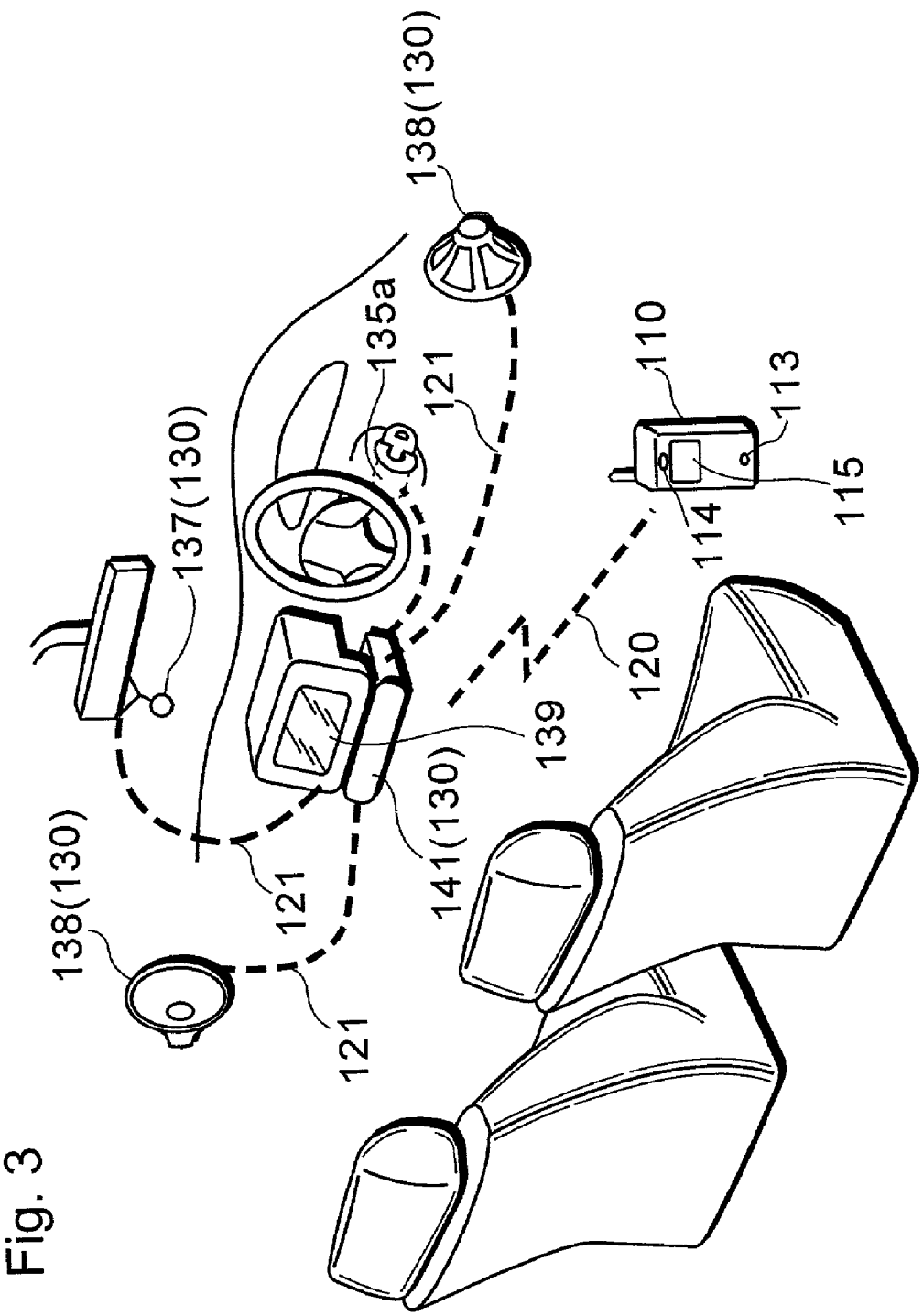
FIG. 3 is an external view of a hands-free communication system of the first embodiment according to the present invention.

FIG. 3 is an external view of the hand-free communication system of the first embodiment.

This hands-free communication system comprises a portable terminal device 110 and a hands-free device 130. The portable terminal device 110 has functions of a portable telephone, and the hands-free device 130 is installed in an automobile and conducts communications over a telephone network by communicating with the portable terminal device 110 that is brought into the automobile.

The hands-free device 130 includes the following elements: a microphone 137 affixed on a rearview mirror, for instance, to collect the speech (voices) of a driver; a speaker 138 that outputs the speech of the other person with whom the driver talks through the hands-free device 130; and an instrument panel 141 that communicates with the portable terminal device 110 via a wireless communication medium 120 and controls the microphone 137 and the speaker 138 in accordance with the communication result. This instrument panel 141 is built in a front panel, a console box or the like, and is connected to the microphone 137 and the speaker 138 with a connection cable 121. This connection cable 121 may be replaced with an in-vehicle bus, or a wireless medium.

The hands-free device 130 and the portable terminal device 110 communicate with each other via the wireless communication medium 120 in accordance with the communication standard of Bluetooth (a trademark of The Bluetooth SIG, Inc.). That is to say, the hands-free device 130 and the portable terminal device 110 comply with the Bluetooth standard, and communicate with each other through short-distance communications of, for instance, 10 or less meters by using a 2.4-GHz electromagnetic wave in an Industrial Scientific and Medical (ISM) frequency band.

Figure 4:
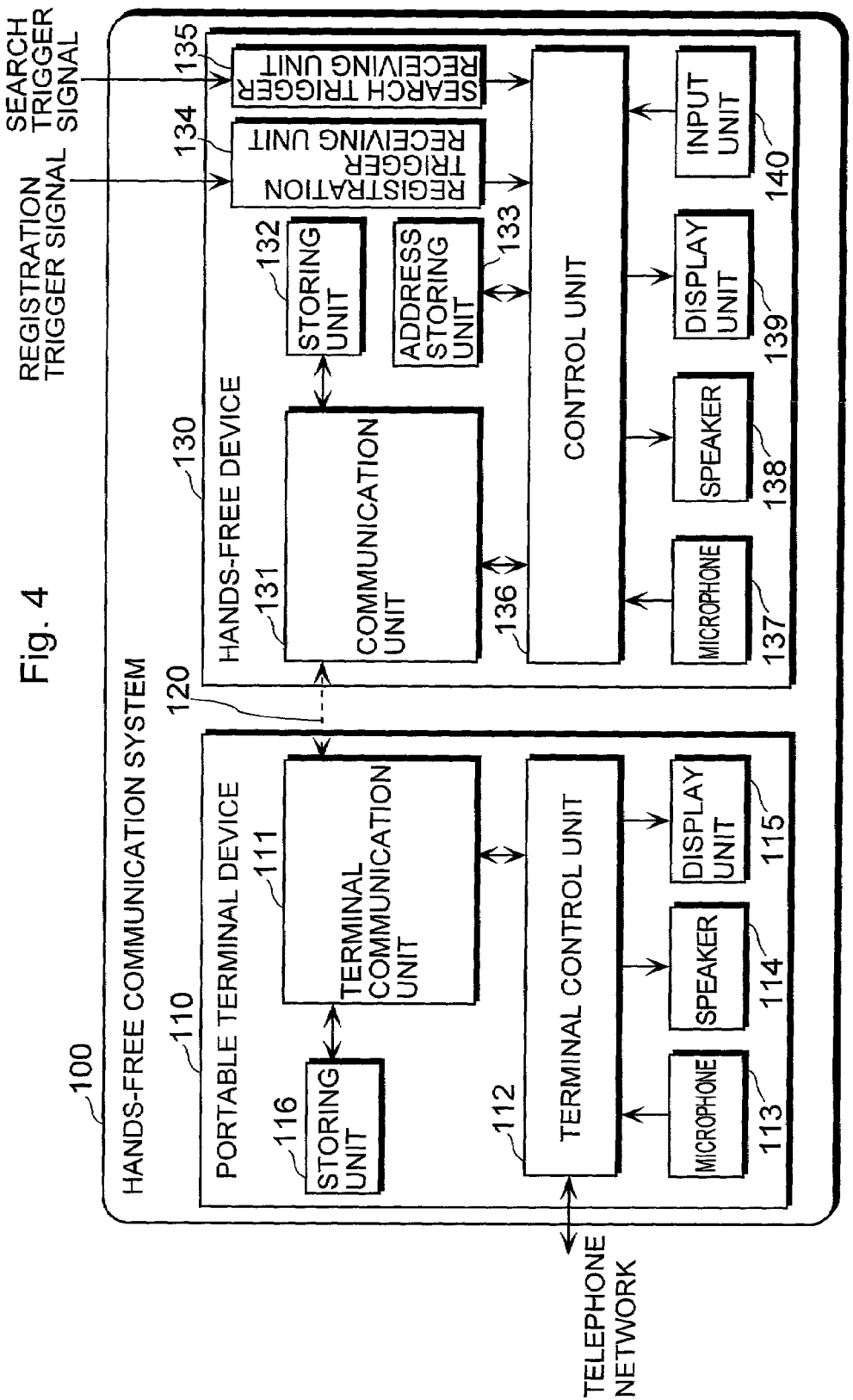
FIG. 4 is a block diagram showing the hands-free communication system of FIG. 3.

FIG. 4 is a block diagram showing the above-described hands-free communication system 100.

The portable terminal device 110 includes the following elements: a terminal communication unit 111 that functions as an interface for communication via the wireless communication medium 120; a microphone 113 that collects the speech of a user; a speaker 114 that outputs the speech of the other person on the line; a display unit 115 for displaying a telephone number and the like; a terminal control unit 112 that controls the terminal communication unit 111, the microphone 113, the speaker 114, and the display unit 115; and a storing unit 116 that stores a Media Access Control (MAC) address and user information.

A MAC address is assigned to each device that conducts communication complying with Bluetooth, and identifies the device. The storing unit 116 stores the MAC address that is assigned to the portable terminal device 1.10. The user information is information on the user of the portable terminal device 110, such as a telephone number of the terminal device 110.

When this portable terminal device 110 is set in normal mode and communicates with another telephone via the telephone network, the terminal device 110 has the microphone 113, the speaker 114, and the display unit 115 operate under the control of the terminal control unit 112. In the normal mode, the user holds the portable terminal device 110 in his hand and speaks with the other person who uses another telephone.

The instrument panel 141 in the hands-free device 130 includes a communication unit 131, a display unit 139, a storing unit 132, an address storing unit 133, a control unit 136, an input unit 140, a registration trigger receiving unit 134, and a search trigger receiving unit 135. The communication unit 131 functions as an interface for communication via the wireless communication medium 120. The display unit 139 displays a telephone number and the like. The storing unit 132 stores a MAC address which is assigned to the hands-free device 130 for conducting communication complying with Bluetooth. The address storing unit 133 stores the MAC addresses assigned to other devices that conduct Bluetooth communication. The control unit 136 controls at least the microphone 137, the speaker 138, the display unit 139, the storing unit 132, and the address storing unit 133. The input unit 140 includes operational buttons and the like, and gives an instruction to the control unit 136 in accordance with an operation on these buttons. The registration trigger receiving unit 134 and the search trigger receiving unit 135 receive a registration trigger signal and a search trigger signal, respectively, from the peripheral units, and give an instruction to the control unit 136 in accordance with the received trigger signal.

This instrument panel 141 may also have additional functions, such as for displaying an operational state of other in-vehicle apparatuses including an air conditioner and a car audio unit and for functioning as an interface for such display. The instrument panel 141 may also have functions as an automobile navigation system, a car audio unit, a television, and the like.

The speaker 138 may be shared by other units within the hands-free communication system 100, the car audio unit, and/or the automobile navigation system. In such a case, the speaker 138 outputs not only the speech of the other person on the line but also music and sound sent from the car audio unit, and guiding voices sent from the automobile navigation system.

The hands-free device 130 exchanges MAC addresses with another device complying with Bluetooth communication, and registers the MAC address of the other device into the address storing unit 133 in accordance with the registration trigger signal. When receiving the search trigger signal, the hands-free device 130 specifies a device whose address is registered in the address storing unit 133, and establishes a communication link with the specified device.

Figure 5:
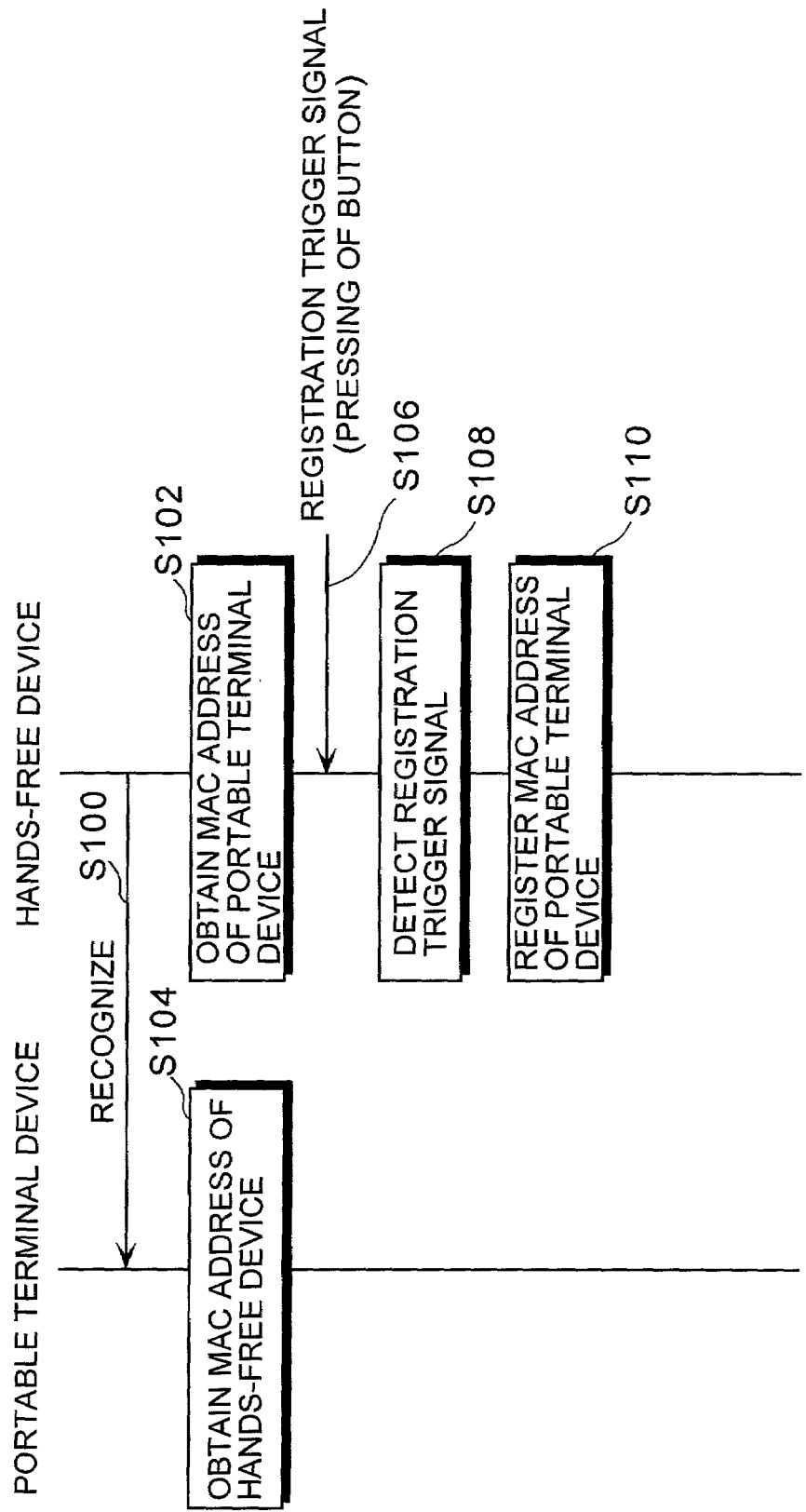
FIG. 5 is a sequence diagram showing a registration operation which is performed by the hands-free communication system.

With reference to FIG. 5, the following sequentially describes an operation which is performed by the hands-free device 130 to register the MAC address of the portable terminal device 110 when the terminal device 110 is brought into the automobile equipped with the hands-free device 130.

FIG. 5 is a sequence diagram showing this operation of the hands-free communication system 100.

The control unit 136 of the hands-free device 130 always searches for a device with which the device 130 can conduct Bluetooth communication in accordance with a result of communication by the communication unit 131 via the wireless communication medium 120.

When the user brings the portable terminal device 110 into the automobile, and the terminal device 110 enters a communicable range of the hands-free device 130, the control unit 136 of the hands-free device 130 recognizes the portable terminal device 110 through the above search as a device with which the hands-free device 130 can communicate (step S100). The control unit 136 then has the communication unit 131 send a request signal requesting the portable terminal device 110 to send its MAC address and user information.

Responding to this request signal, the terminal control unit 112 of the potable terminal device 110 has the terminal communication unit 111 send the MAC address and user information stored in the storing unit 116 to the hands-free device 130. The control unit 136 of the hands-free device 130 then receives the MAC address and the user information via the communication unit 131, and temporarily stores the MAC address and the user information into the storing unit 132 (step S102). That is to say, the control unit 136 and the communication unit 131 of the hands-free device 130 function as a means for obtaining the MAC address and user information of the portable terminal device 110.

The control unit 136 then has the communication unit 131 send the MAC address of the hands-free device 130 stored in the storing unit 132 to the portable terminal device 110.

The terminal control unit 112 receives this MAC address via the terminal communication unit 111, and temporarily stores the MAC address of the hands-free device 130 into the storing unit 116 (step S104).

In this way, the portable terminal device 110 and the hands-free device 130 exchange their MAC addresses, so that they can specify and communicate with each other.

When the registration trigger signal is inputted from the peripheral unit to the hands-free device 130 (step S106) and detected by the registration trigger receiving unit 134 (step S108), the trigger receiving unit 134 instructs the control unit 136 to register the MAC address of the portable terminal device 110 currently stored in the storing unit 132.

Upon receiving this instruction, the control unit 136 reads the MAC address of the portable device 110 from the storing unit 132 via the communication unit 131, and registers the read MAC address into the address storing unit 133 (step S10). That is to say, the address storing unit 133 and the control unit 136 function as a means for registering a MAC address.

The above-described registration trigger signal is outputted from the peripheral unit when the user presses an operational button on the front of the instrument panel 141.

The control unit 136 also reads the MAC address and user information from the storing unit 132 via the communication unit 131, and has the display unit 139 display the read MAC address and user information. By referring to the displayed user information, the user recognizes that the portable terminal device 110 can currently communicate with the hands-free device 130. When the user wishes to conduct hands-free communication, such as during driving, by having the hands-free device 130 communicate with the portable terminal device 110, the user presses the above-described operational button to have the registration trigger signal outputted.

It is alternatively possible to provide a touch panel function to the display unit 139 and embody the above-described operational button on the display unit 139. In this case, the display unit 139 outputs the registration trigger signal to the registration trigger receiving unit 134 in accordance with a touch operation by the user.

Figure 6:
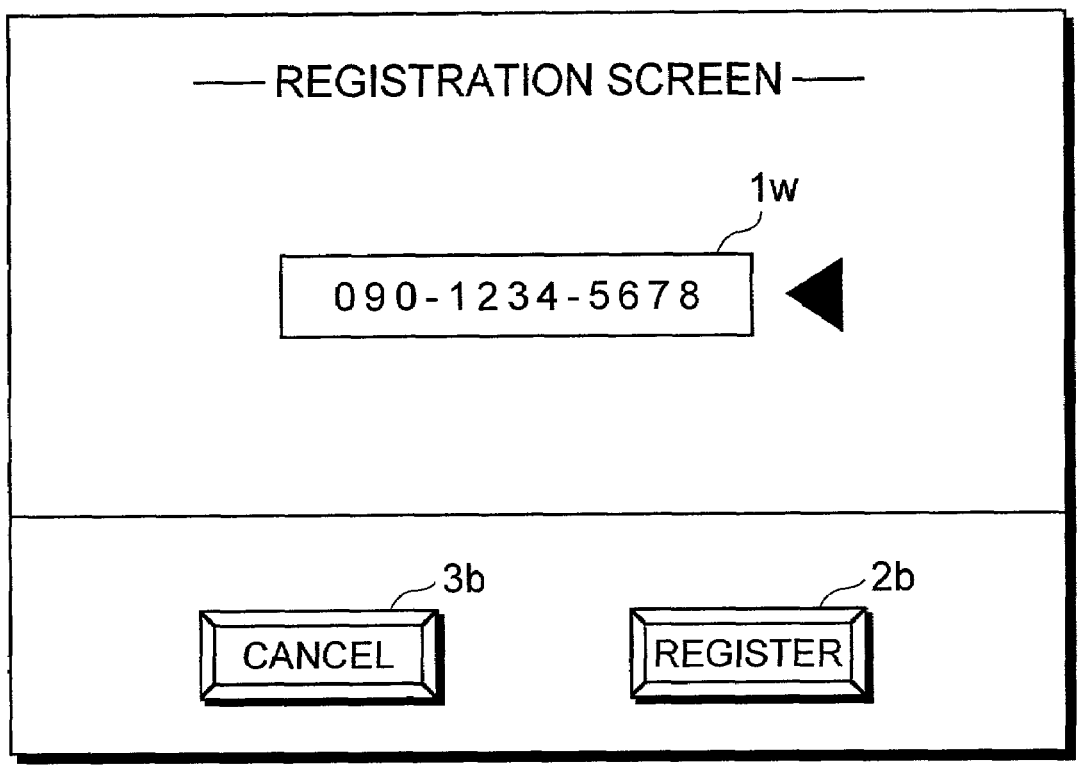
FIG. 6 shows a registration screen which is used for the first embodiment.

FIG. 6 shows a registration screen which is presented by the display unit 139 to prompt the user to register a device with which a communication link should be established.

This registration screen includes a user information area 1w, a registration button 2b, and a cancel button 3b. In the user information area 1w, the user information for the device that can be registered as a communication link destination is displayed. Upon receiving a touch (manual input) by the user, the registration button 2b has the display unit 139 output the registration trigger signal to register the device specified by the displayed user information as a communication link destination. Upon receiving a touch by the user, the cancel button 3b has the display unit 139 output a cancel signal to cancel the above registration.

For example, as shown in FIG. 6, user information "090-1234-5678" of the portable terminal device 110 is displayed in the user information area 1w. From this user information, that is, a telephone number, the user judges that the portable terminal device 110 can communicate with the hands-free device 130. When the user wishes to conduct the hands-free communication, such as during driving, by having the hands-free device 130 communicate with the portable terminal device 110, he touches the registration button 2b, so that the display unit 139 outputs the registration trigger signal.

The registration trigger receiving unit 134 detects this registration trigger signal, and instructs the control unit 136 to register the MAC address stored in the storing unit 132 as described above. The control unit 136 then associates this MAC address with the user information to produce address data 133a, and registers the produced address data 133a in the address storing unit 133.

Figure 7:
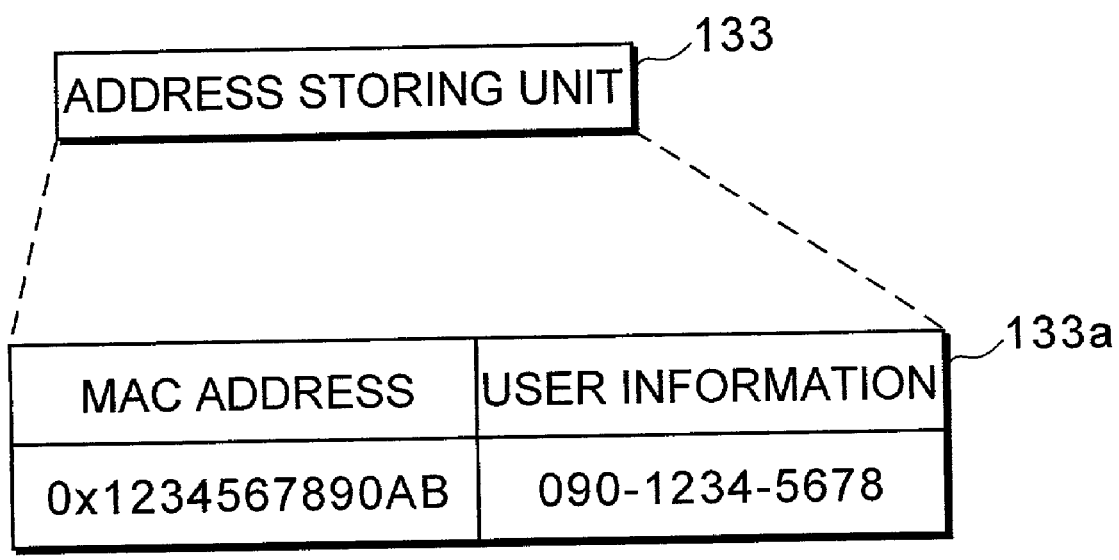
FIG. 7 is a table showing address data which is used for the first embodiment.

FIG. 7 is a table showing the address data 133a.

This address data 133a includes the MAC address "0x1234567890AB" and the user information "090-1234-5678".

With the above registration screen, when the user touches the cancel button 3b and the display unit 139 outputs the cancel signal to the control unit 136, the control unit 136 instructs the display unit 139 to clear the registration screen.

In the above example, the telephone number is displayed as the user information in the user information area 1w. However, it is alternatively possible to display, as the user information, a name of an owner of a device complying with the Bluetooth standard, or a MAC address of such device.

In this way, the hands-free device 130 registers the portable terminal device 110 as a communication link destination in accordance with a user operation on either the operational button or the registration button 2b of the display unit 138.

Figure 8:
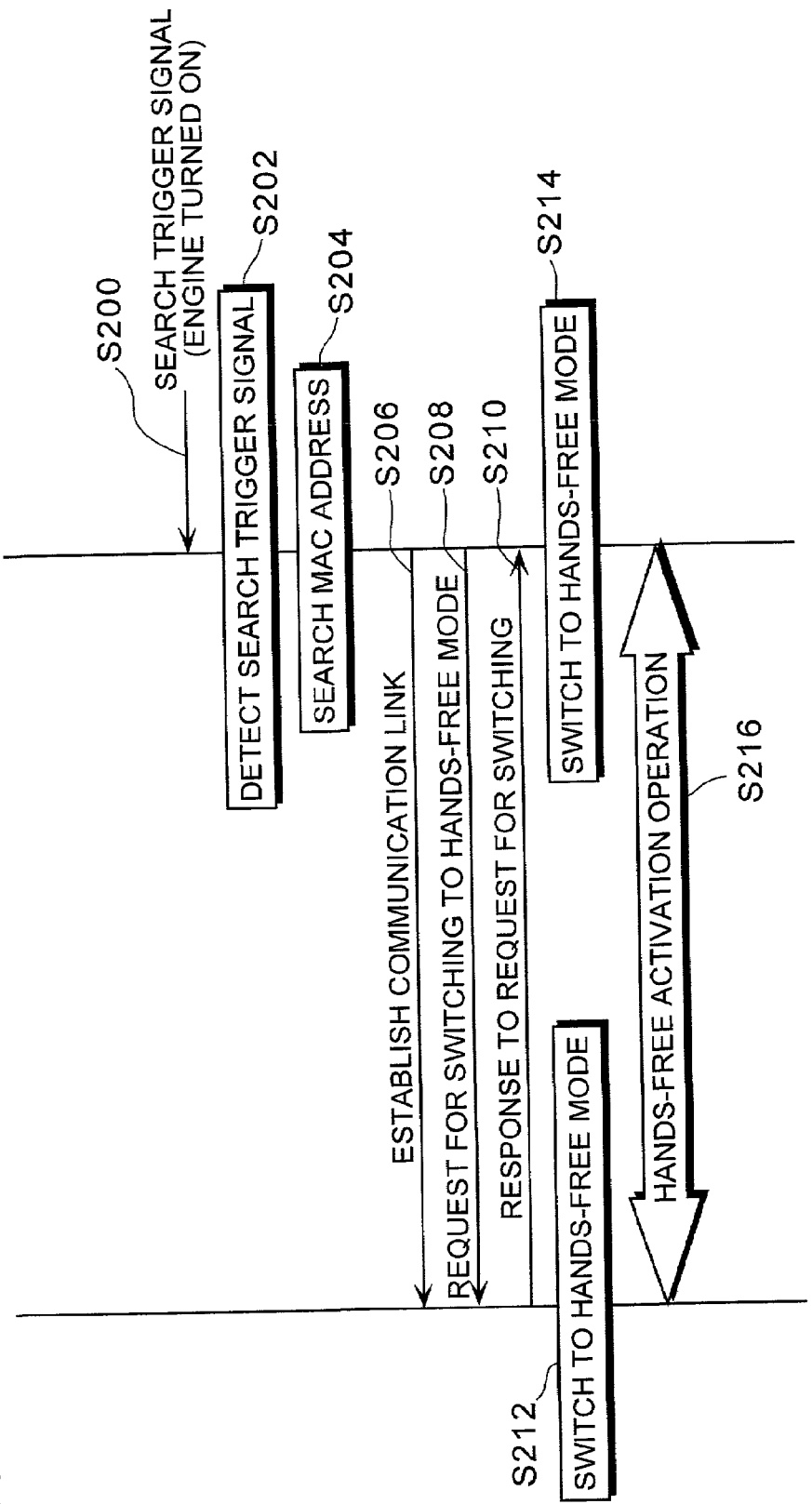
FIG. 8 is a sequence diagram showing an operation which is performed by the hands-free communication system to specify a portable terminal device.

With reference to FIG. 8, the following sequentially describes an operation which is performed by the hands-free communication system 100 to conduct a hands-free activation operation when the portable terminal device 110, which has been registered in the stated manner, is brought into the automobile.

FIG. 8 is a sequence diagram showing this operation of the hands-free communication system 100.

As shown in steps S100–S104 in FIG. 5, the user brings the portable terminal device 110 into the automobile, so that the terminal device 110 enters the communicable range of the hands-free device 130. The hands-free device 130 then obtains the MAC address and the user information of the portable terminal device 110, and the portable terminal device 110 obtains the MAC address of the hands-free device 130.

When the hands-free device 130 receives the search trigger signal at this point from the peripheral unit (step S200), the search trigger receiving unit 135 of the hands-free device 130 detects this trigger signal (step S202).

This search trigger signal is outputted by a search trigger transmitting unit 135a when the engine of the automobile is turned on. More specifically, when the user inserts a car key into a keyhole on the side of a steering wheel and turns the key in the direction to start the engine, the search trigger transmitting unit 135a detects this turn of the key, and outputs the search trigger signal.

After detecting such a search trigger signal, the search trigger receiving unit 135 notifies the control unit 136 of the detection, so that the control unit 136 searches the address data 133a in the address storing unit 133 for a registered MAC address (step S204).

As a result of this search, the control unit 136 finds the MAC address "0x1234567890AB", and specifies the portable terminal device 110 having the found MAC address as a communication target device. The control unit 136 then establishes a Bluetooth communication link between the communication unit 131 of the hands-free device 130 and the terminal communication unit 111 of the portable terminal device 110 (step S206). In this way, the control unit 136 functions as a means for specifying a communication target device.

When the address data 133a in the address storing unit 133 does not include any MAC address, and therefore the control unit 136 does not find any MAC address in step S204, then the control unit 136 does not establish the communication link. Consequently, the portable terminal device 110 in the automobile conducts communication in the normal mode.

When the communication link is established as stated above, the hands-free device 130 and the portable terminal device 110 switch to the hands-free mode to enable the hands-free activation operation that is described later.

More specifically, the control unit 136 requests, via the communication unit 131, the portable terminal device 110 to switch to the hands-free mode (step S208).

The terminal control unit 112 of the portable terminal device 110 receives this request via the terminal communication unit 111, and notifies the hands-free device 130 that the terminal device 110 is going to switch to the hands-free mode (step S210).

Following this, both the portable terminal device 110 and the hands-free device 130 switch to the hands-free mode (steps S212 and S214). The hands-free communication system 100 then performs the aforementioned hands-free activation operation, which is an operation to activate the microphone 137 and the speaker 138, so that the hands-free communication can be conducted when the user calls another telephone by using the hands-free device 130, or when the portable terminal device 110 receives a call from another telephone (step S216).

As has been described, communication target devices for the hands-free device 130 are registered in the hands-free device 130 in advance. When the user carrying one of the registered devices, that is, the portable terminal device 110, starts the engine of the automobile, the hands-free device 130 automatically specifies the portable terminal device 110 as a communication target device without requiring the user to perform a cable connection as in the conventional system, and establishes the communication link with the portable terminal device 110.

The operation of the hands-free communication system 100 has been described based on examples in which a single portable terminal device 110 complying with the Bluetooth standard is brought into the automobile. The following describes examples in which a plurality of such portable terminal devices 110 are brought into the automobile.

Figure 9:
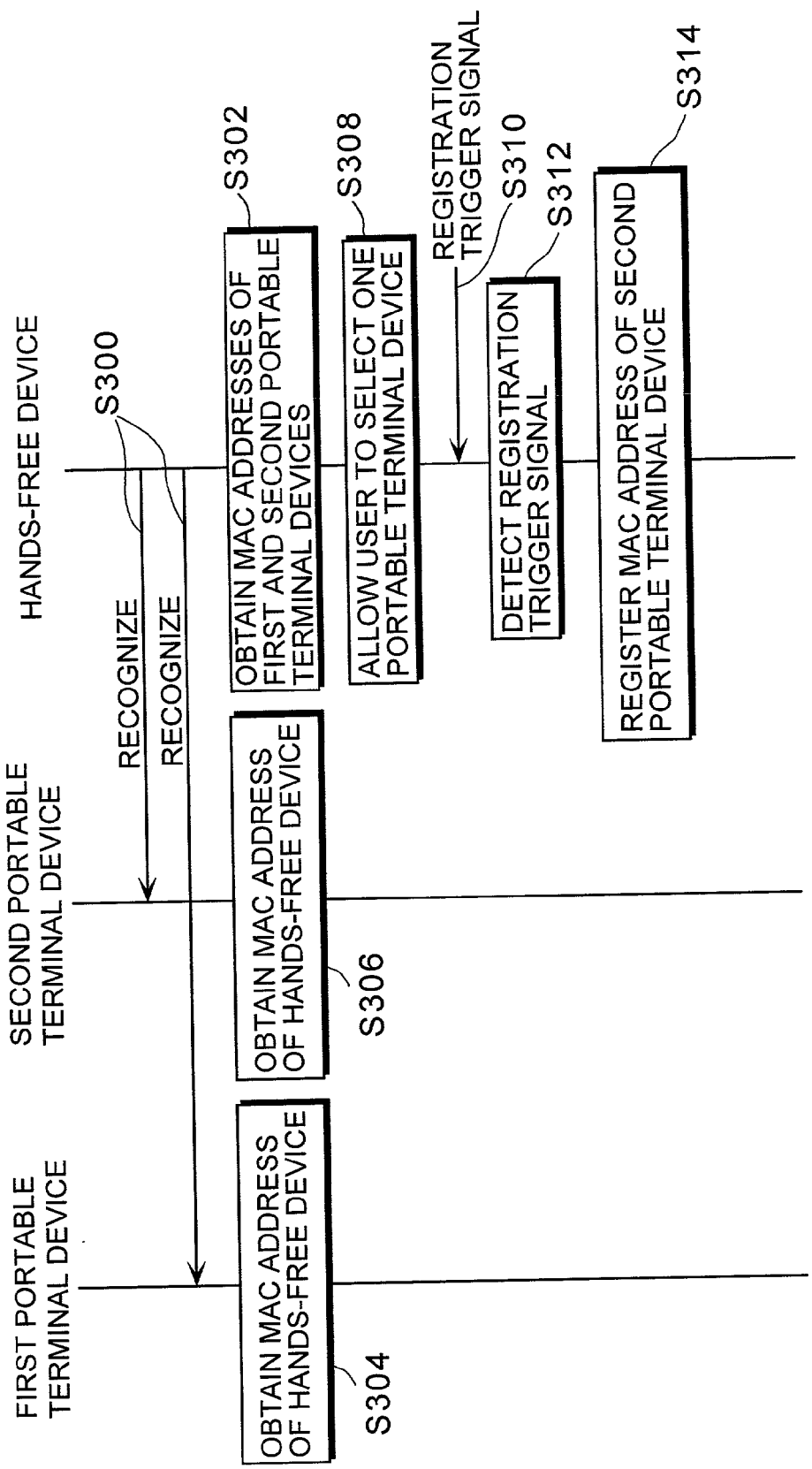
FIG. 9 is a sequence diagram showing a registration operation which is performed by the hands-free communication system.

FIG. 9 is a sequence diagram showing an operation of the hands-free communication system 100 to register MAC addresses of first and second portable terminal devices 110.

Through communication by the communication unit 131 via the wireless communication medium 120, the control unit 136 of the hands-free device 130 always searches for a device with which the hands-free device 130 can conduct Bluetooth communication.

When the driver and a passenger bring the first and second portable terminal devices 110, respectively, into the automobile, and therefore these portable terminal devices 110 enter into a communicable range of the hands-free device 130, the control unit 136 of the hands-free device 130 recognizes the first and second portable terminal devices 110 through the above search as devices with which the hands-free device 130 can perform Bluetooth communication (step S300). The control unit 136 then has the communication unit 131 send a request signal that requests the first and second portable terminal devices 110 to send their respective MAC address and user information.

Responding to this request signal, the first and second portable terminal devices 110 send their MAC addresses and user information stored in their respective storing units 116 to the hands-free device 130. The control unit 136 of the hands-free device 130 receives their respective MAC address and user information via the communication unit 131, associates each MAC address with the user information, and temporarily stores them into the storing unit 132 (step S302). The control unit 136 then instructs the communication unit 131 to send the MAC address of the hands-free device 130 stored in the storing unit 132 to the first and second portable terminal devices 110.

The first and second portable terminal devices 110 receive the MAC address of the hands-free device via the terminal communication unit 111, and temporarily stores this MAC address into their respective storing units 116 (steps S304 and S306).

In this way, the first and second portable terminal devices 110 and the hands-free device 130 exchange their MAC addresses, so that the hands-free device 130 can specify one of the first and second portable terminal devices 110 as a communication target device and establish a communication link with the specified portable terminal device 110.

When receiving a plurality of MAC addresses and sets of user information as described above, the control unit 136 of the hands-free device 130 displays a registration screen that prompts the user to register a device with which the communication link should be established. When the display unit 139 has a touch panel function, the display unit 139 displays not only user information of the first and second portable terminal devices 110 on the registration screen but also a selecting means for allowing the user to select, through a touch operation, one of the portable terminal devices 110 to register as a communication link destination (step S308).

Figure 10:
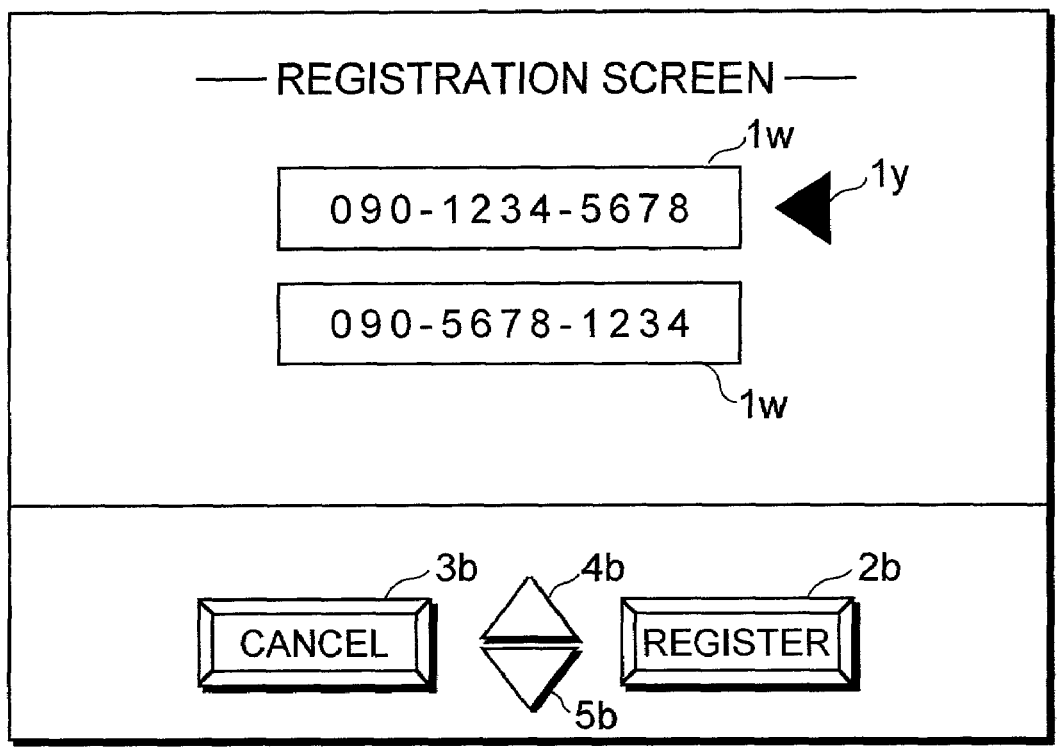
FIG. 10 shows another registration screen which is used for the first embodiment.

FIG. 10 shows this registration screen which is displayed by the display unit 139.

The registration screen includes two user information areas 1w, a registration button 2b, a cancel button 3b, and a triangular mark 1y that indicates one of the user information areas 1w. In one user information area 1w, the telephone number "090-1234-5678", that is, the user information of the first potable terminal device 110, is displayed. In the other user information area 1w, a telephone number "090-5678-1234", that is, the user information of the second portable terminal device 110, is displayed. This registration screen also includes move buttons 4b and 5b to move the triangular mark 1y.

When the user wishes to register the second portable terminal device 110 as a communication link destination, the user touches the move buttons 4b and 5b to have the triangular mark 1y indicate the telephone number "090-5678-1234" of the second portable terminal device 110, and then touches the registration button 2b.

Consequently, the display unit 139 outputs the registration trigger signal to register the second portable terminal device 110 as a communication link destination (step S310).

The registration trigger receiving unit 134 detects the above-described registration trigger signal (step S312), and instructs the control unit 136 to register the MAC address that is stored in the storing unit 132 and associated with the telephone number "090-5678-1234".

Upon receiving this instruction, the control unit 136 obtains this MAC address and the associated user information from the storing unit 132 via the communication unit 131, and registers them into the address storing unit 133 (step S314).

In this way, the user operates the registration button 2b and the move buttons 4b and 5b to register the second portable terminal device 110 into the hands-free device 130 as a communication link destination.

Figure 11:
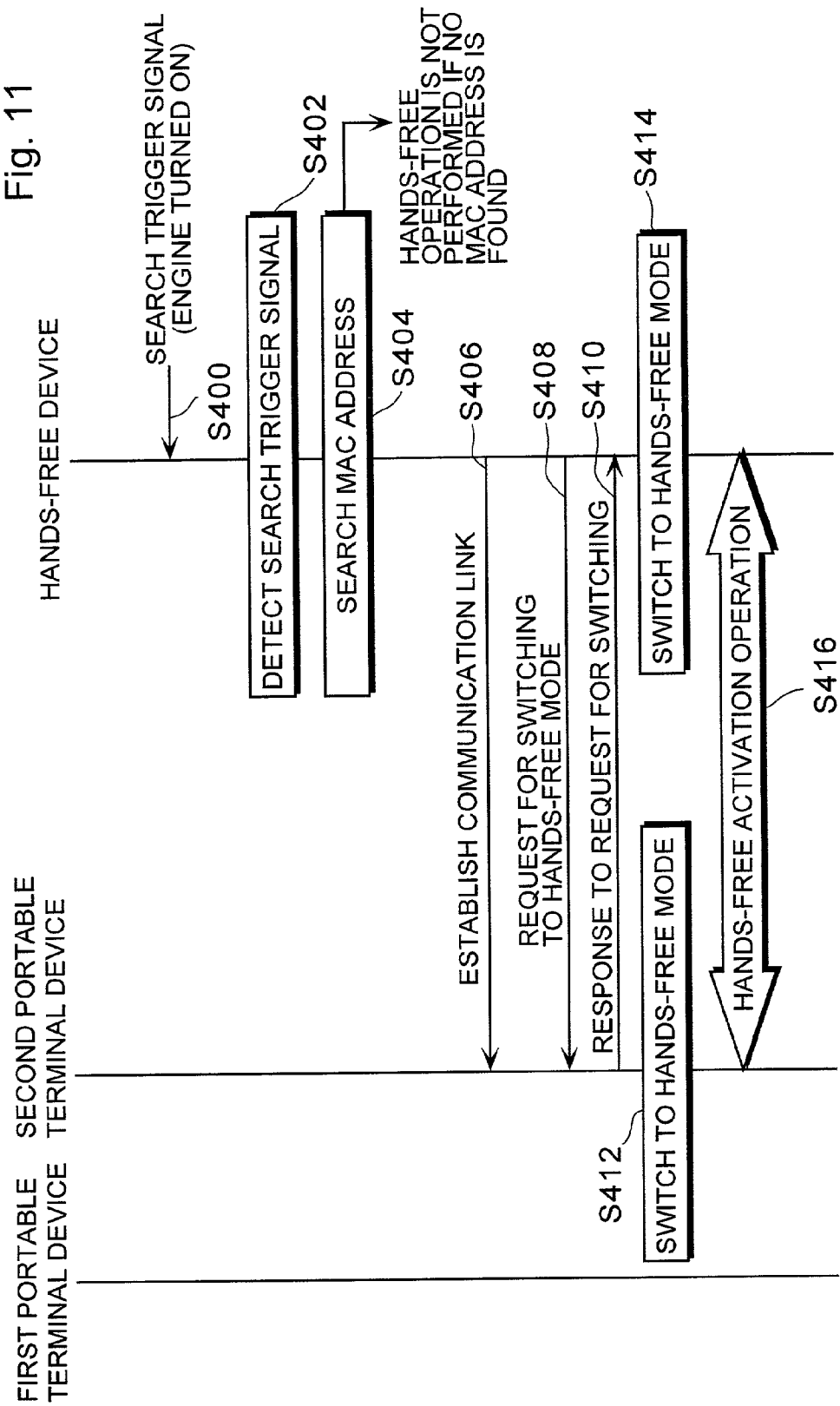
FIG. 11 is a sequence diagram showing an operation which is performed by the hands-free communication system to specify a portable terminal device.

With reference to FIG. 11, the following sequentially describes an operation that ends with the hands-free activation operation which is performed by the registered second portable terminal device 110 and the hands-free device 130 when the first and second portable terminal devices 110 are brought into the automobile.

FIG. 11 is a sequence diagram showing this operation of the hands-free communication system 100.

When the users bring the first and second portable terminal devices 110 into the automobile, both the portable terminal devices 110 enter the communicable range of the hands-free device 130. As shown in steps S300–S306 in FIG. 9, the hands-free device 130 obtains the MAC addresses and user information of the first and second portable terminal devices 110, which in turn obtain the MAC address of the hands-free device 130.

When the hands-free device 130 receives the search trigger signal at this point from the peripheral unit (step S400), the search trigger receiving unit 135 detects this trigger signal (step S402).

This search trigger signal is outputted by the search trigger transmitting unit 135a as in step S200 in FIG. 8.

Upon detecting the search trigger signal, the search trigger receiving unit 135 notifies the control unit 136 of the detection, so that the control unit 136 searches for a MAC address in the address data 133a registered in the address storing unit 133 (step S404).

As a result of this search, the control unit 136 finds the MAC address of the second portable terminal device 110, for example, and specifies the second portable terminal device 110 as a communication target device. The control unit 136 then establishes a Bluetooth communication link between the communication unit 131 of the hands-free device 130 and the terminal communication unit 111 of the second portable terminal device 110 (step S406).

When the address data 133a in the address storing unit 133 does not include any MAC address, and therefore the control unit 136 does not find any MAC address in step S404, then the control unit 136 does not establish the communication link.

When the communication link is established, the hands-free device 130 and the portable terminal device 110 switch to the hands-free mode to enable the hands-free activation operation.

More specifically, the control unit 136 requests, via the communication unit 131, the second portable terminal device 110 to switch to the hands-free mode (step S408).

The terminal control unit 112 of the second portable terminal device 110 receives this request via the terminal communication unit 111, and notifies the hands-free device 130 that the second portable terminal device 110 is going to switch to the hands-free mode (step S410).

Following this, both the second portable terminal device 110 and the hands-free device 130 switch to the hands-free mode (steps S412 and S414).

Consequently, the second portable terminal device 110 and the hands-free device 130 perform the hands-free activation operation by activating the microphone 137 and the speaker 138, so that the hands-free communication can be conducted when the user calls another telephone by using the hands-free device 130, or when the second portable terminal device 110 receives a call from another telephone (step S416).

As has been described, a portable terminal device 110 which is desired by the user as a communication link destination of the hands-free device 130 is registered in the hands-free device 130 in advance. With this technique, the hands-free device 130 can automatically specify the registered portable terminal device 110 as a communication target device as soon as the user starts the engine even when the user brings a plurality of portable terminal devices 110 into the automobile. As a result, Bluetooth communication link is established between the hands-free device 130 and the specified portable terminal device 110.

For the above-described first embodiment, the registration trigger signal is outputted in accordance with an operation of the registration button 2b displayed on the touch panel achieved by the display unit 139. It is alternatively possible, however, to have the control unit 136 of the hands-free device 136 monitor a communication state of the portable terminal device 110 sending the MAC address and user information by referring to a signal that is sent from the portable terminal device 110 to the communication unit 131 of the hands-free device 130. In this case, the control unit 136 outputs the registration trigger signal when the monitored communication state satisfies a predetermined communication condition. This may be performed, for instance, by having the control unit 136 measure an electric field intensity of a wireless signal that is sent from the portable terminal device 110 and by having the registration trigger signal outputted when the measured electric field intensity is higher than a predetermined value. In this case, a MAC address of a portable terminal device 110 can be automatically registered in the address storing unit 133 without user operation.

It is also possible to associate the above communication state with the MAC address and user information of the portable terminal device 110 and to temporarily store them into the storing unit 132 as a set of information. When the total number of such sets of information in the storing unit 132 reaches a predetermined number, the control unit 136 may specify a portable terminal device 110 which is associated with the best communication state (e.g., the highest electric field intensity) of all the stored communication states, and have the registration trigger signal outputted so as to register the specified portable terminal device 110. In this case, too, a MAC address of the portable terminal device 110 can be automatically registered in the address storing unit 133 without user operations. In addition, the hands-free device 130 can specify a portable terminal device 110 in the best communication state as a communication target device.

It is alternatively possible to assign a priority to each pair of a MAC address and user information obtained from a portable terminal device 110 and to temporarily store them in the storing unit 132. When the registration trigger signal is outputted while a plurality of pairs are stored in the storing unit 132, the control unit 136 registers a MAC address, which is included in a pair with the highest priority, into the address storing unit 133.

The above-described first embodiment states that the search trigger transmitting unit 135a outputs a search trigger signal when the automobile engine is started. The search trigger signal, however, may be alternatively outputted by a sensor that is affixed on a driver's seat to detect a movement of the driver taking the seat. This allows the hands-free device 130 to specify an appropriate portable terminal device 110 as a communication target device and to establish a communication link with the specified portable terminal device 110 as soon as the driver simply takes the seat.

It is alternatively possible to provide the search trigger transmitting unit 135a in a transmitter of a keyless entry system.

This transmitter is integrated with a car key. When the user operates an operational button on the transmitter, the transmitter transmits an unlock signal to unlock car doors. The search trigger transmitting unit 135a in this transmitter detects the user operation of the above-described operational button, and outputs the search trigger signal at almost the same time as the output of the unlock signal.

As a result, the hands-free device 130 can specify an appropriate portable terminal device 110 as a communication target device and establish a communication link with the specified portable terminal device 110 as soon as the driver simply operates the transmitter to unlock the car door.

Second Embodiment

The following describes a hands-free communication system according to a second embodiment of the present invention.

Figure 12:
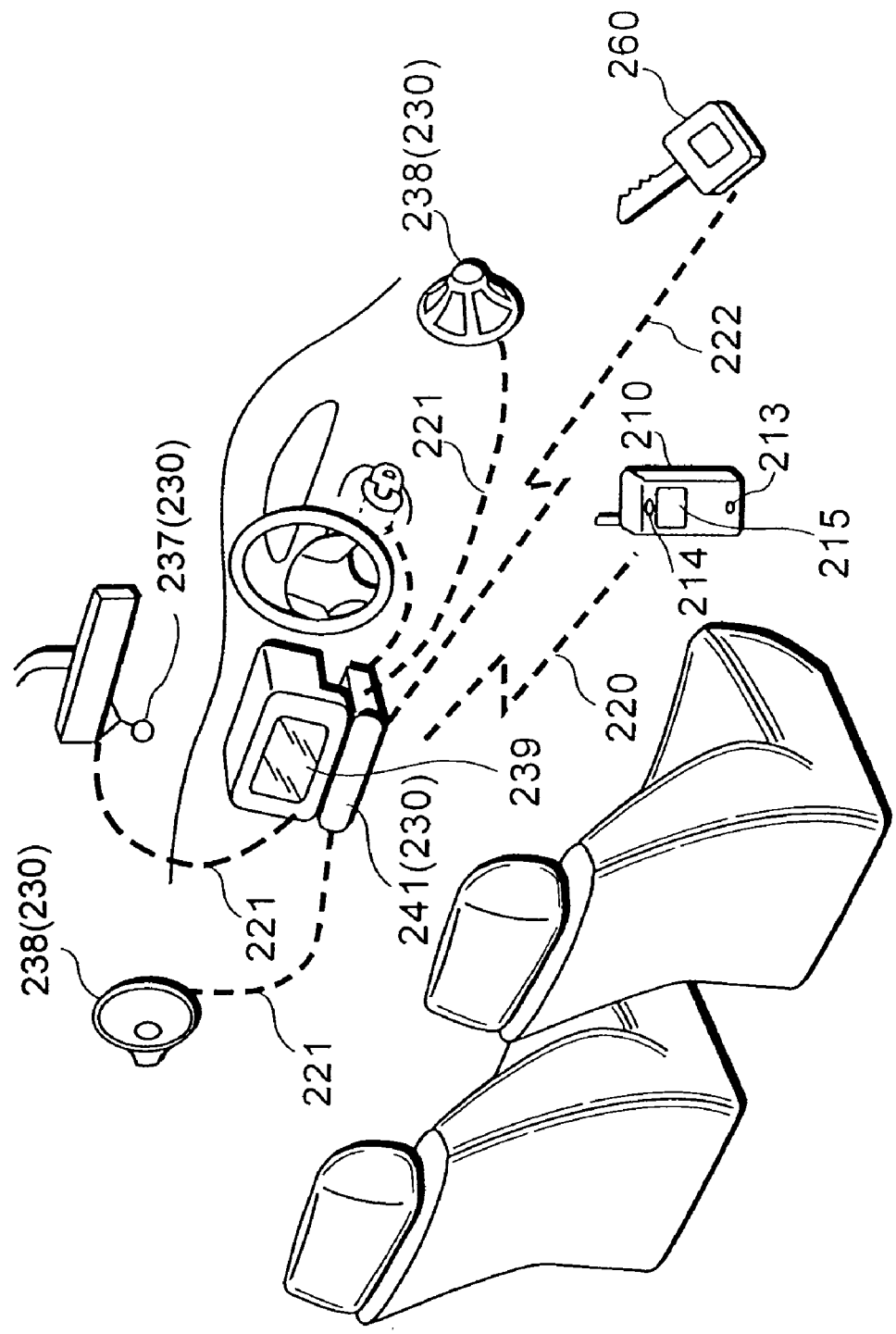
FIG. 12 is an external view of a hands-free communication system of the second embodiment according to the present invention.

FIG. 12 is an external view of the hand-free communication system of the second embodiment.

The hands-free communication system of the second embodiment has a characteristic in that a personal ID (identifier) is registered into a hands-free device 230, and the hands-free communication system comprises the following elements: a portable terminal device 210 that has a function of a portable telephone; the hands-free device 230 that is installed in an automobile and conducts communication over a telephone network by communicating with the portable terminal device 210 when the portable terminal device 210 is brought in the automobile; and a personal ID device 260 that stores a personal ID identifying each user and outputs the personal ID in accordance with an operation of the user.

The personal ID device 260 is integrated into a car key, and also functions as a transmitter of a keyless entry system. When the user operates an operational button of the personal ID device 260, the personal ID device 260 transmits the stored personal ID and an unlock signal to unlock car doors. Such a personal ID device 260 is provided to each user.

The personal ID device 260 may be achieved by a fingerprint authentication device that outputs a fingerprint of the user as his ID information, or the personal ID device 260 may be achieved by a password input device that stores a password in advance and outputs the password in response to user operation.

As in the first embodiment, the hands-free device 230 includes the following elements: a microphone 237 that is affixed on a rearview mirror, for instance, in the automobile to collect the speech of a driver; a speaker 238 that outputs the speech sent from the other person with whom the driver talks through the hands-free device 230; and an instrument panel 241 that communicates with the portable terminal device 210 via a wireless communication medium 220 and that controls the microphone 237 and the speaker 138 in accordance with the communication result. This instrument panel 241 is built into a front panel, a console box, or the like in the automobile. The microphone 237 and the speaker 238 are connected to the instrument panel 241 with a connection cable 221.

The hands-free device 230 and the portable terminal device 210 communicate with each other via the wireless communication medium 220 in accordance with the communication standard of Bluetooth.

Figure 13:
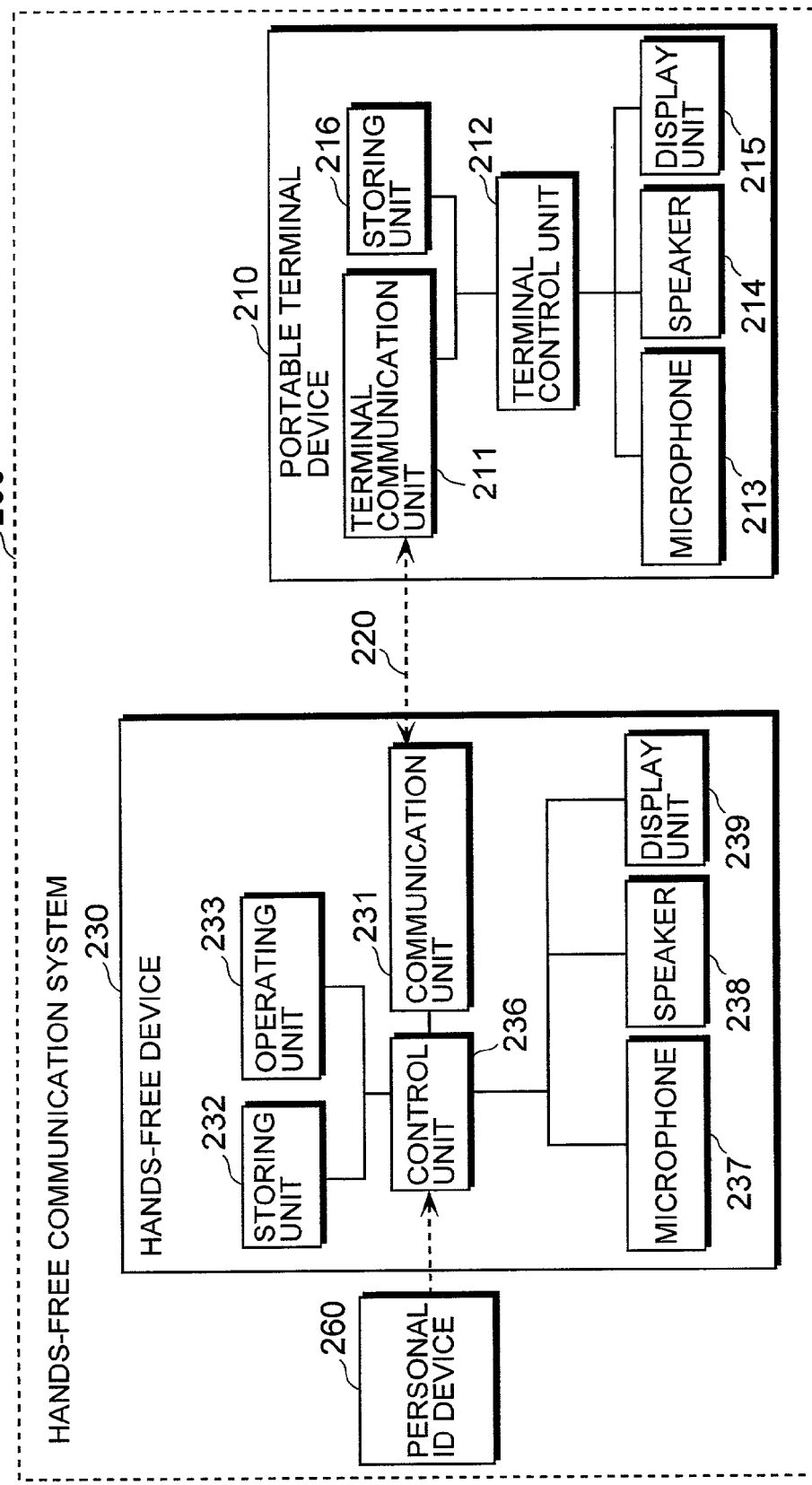
FIG. 13 is a block diagram showing the hands-free communication system of FIG. 12.

FIG. 13 is a block diagram showing the above-described hands-free communication system 200.

The portable terminal device 210 has basically the same construction as the portable terminal device 110 of the first embodiment, and includes the following elements: a terminal communication unit 211 that functions as an interface for communication via the wireless communication medium 220; a microphone 213 that collects the speech of a user; a speaker 214 that outputs the speech of the other person on the line; a display unit 215 that displays a telephone number and the like; a terminal control unit 212 that controls the terminal communication unit 211, the microphone 213, the speaker 214, and the display unit 215; and a storing unit 216 that is achieved by RAM, for example, and stores a MAC address and user information assigned to the portable terminal device 210.

Figure 14:
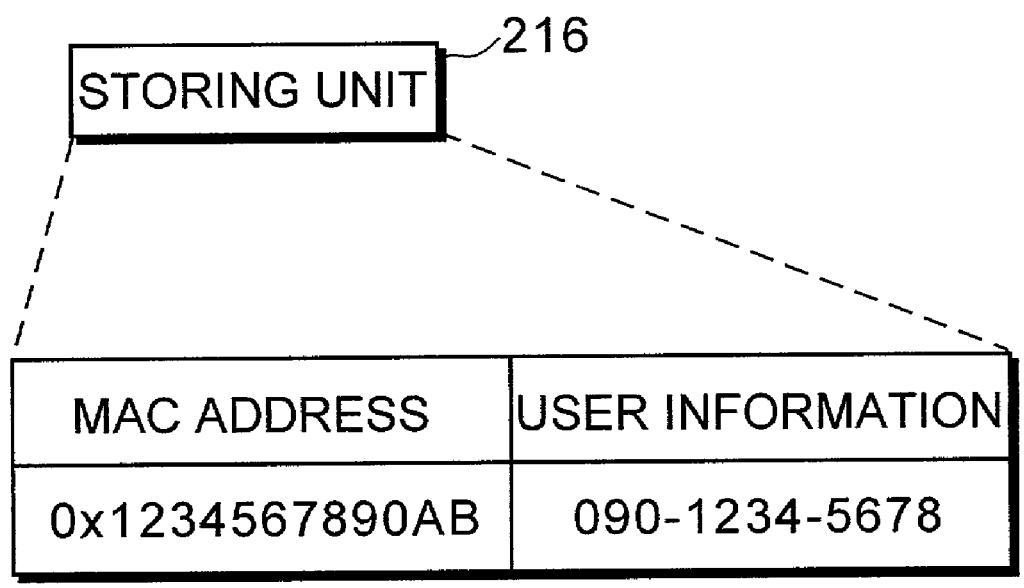
FIG. 14 is a table showing example contents of information stored in a storing unit of a portable terminal device for the second embodiment.

FIG. 14 shows an example of a table stored in the storing unit 216.

The storing unit 216 shown in FIG. 14 stores a MAC address "0x1234567890AB" and user information "090-1234-5678" which is associated with this MAC address.

When this portable terminal device 210 is set in normal mode and communicates with another telephone via the telephone network, the portable terminal device 210 has the microphone 213, the speaker 214, and the display unit 215 operate under the control of the terminal control unit 212. In the normal mode, the user holds the portable terminal device 210 in his hand and speaks with the other person who uses another telephone.

The instrument panel 241 in the hands-free device 230 includes a communication unit 231, a display unit 239, a storing unit 232, a control unit 236, and an operating unit 233. The communication unit 231 functions as an interface for communication via the wireless communication medium 220. The display unit 239 includes, for instance, a liquid-crystal display (LCD), and displays a telephone number and the like. The storing unit 232 stores a MAC address which is assigned to the hands-free device 230 for Bluetooth communication. The control unit 236 controls at least the microphone 237, the speaker 238, the display unit 239, and the storing unit 232. The operating unit 233 includes operational buttons and the like to give an instruction to the control unit 236 in accordance with a user operation of these buttons.

In more detail, the control unit 236 contains, for instance, the following elements: a central processing unit (CPU) that executes a program for communicating with the portable terminal device 210; read-only memory (ROM) that stores the above program; and random-access memory (RAM) that is used by the CPU as storage regions while executing the program.

The storing unit 232 is achieved by RAM, for example. Alternatively, this storing unit 232 may be achieved by the RAM in the control unit 236.

The hands-free device 230 exchanges MAC addresses with another device complying with Bluetooth communication, and registers the obtained MAC address of the other device into the storing unit 233. The hands-free device 230 specifies the device, whose MAC address is registered, as a communication target device, and establishes a communication link with the specified device.

Figure 15:
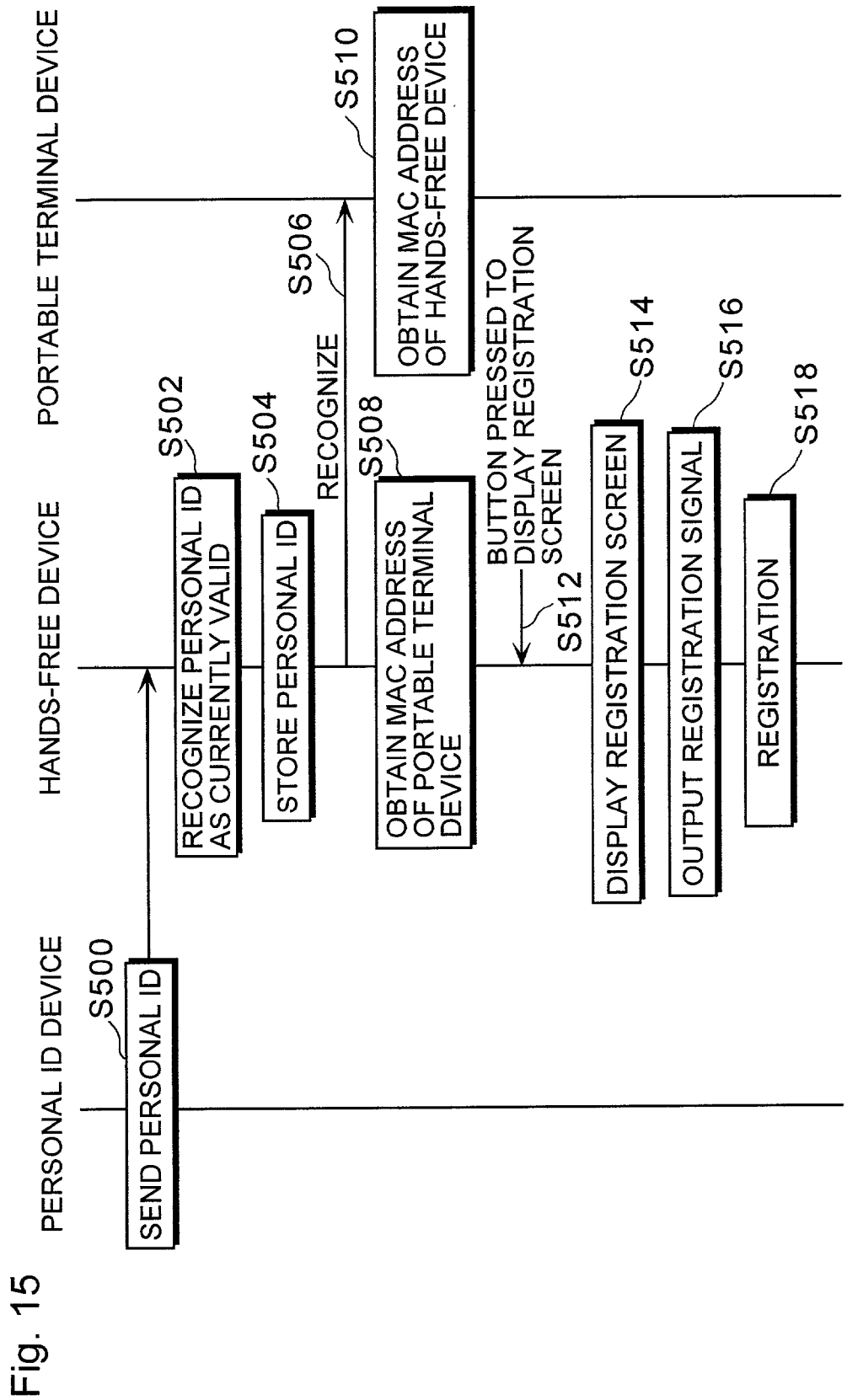
FIG. 15 is a sequence diagram showing a registration operation which is performed by the hands-free communication system.

With reference to FIG. 15, the following sequentially describes an operation which is performed by the hands-free device 230 to register the MAC address of the portable terminal device 210 when the driver brings the above-described personal ID device 260 and the portable terminal device 210 into an automobile which is equipped with the hands-free device 230.

FIG. 15 is a sequence diagram showing this operation of the hands-free communication system 200.

The driver operates an operational button on the personal ID device 260 to get into the automobile. The personal ID device 260 then transmits the unlock signal and the stored personal ID "1" (step S500).

The control unit 236 of the hands-free device 230 receives this personal ID, recognizes the personal ID as the latest, i.e., currently valid (step S502), and places the personal ID into the storing unit 232 (step S504).

Through communication via the wireless communication medium 220 by the communication unit 231, the control unit 236 always searches for a device with which the control unit 236 can conduct Bluetooth communication.

When the user has the unlock signal unlock the car doors, gets into the automobile, and is carrying the portable terminal device 210, the portable terminal device 210 enters a communicable range of the hands-free device 230. The control unit 236 of the hands-free device 230 then recognizes the portable terminal device 210 through the above search as a device with which the control unit 236 can communicate (step S506), and has the communication unit 231 send a request signal to request the portable terminal device 210 to send its MAC address and user information.

Responding to this request signal, the terminal control unit 212 of the potable terminal device 210 has the terminal communication unit 211 send its MAC address and user information stored in the storing unit 216 to the hands-free device 230. The control unit 236 of the hands-free device 230 then receives the MAC address and the user information via the communication unit 231, and temporarily stores them into the storing unit 232 (step S508). That is to say, the control unit 236 and the communication unit 231 of the hands-free device 230 make up a means for obtaining the MAC address and user information of the portable terminal device 210.

The control unit 236 then has the communication unit 231 send the MAC address of the hands-free device 230 stored in the storing unit 232 to the portable terminal device 210.

The terminal control unit 212 receives this MAC address of the hands-free device 230 via the terminal communication unit 211, and temporarily places the MAC address of the hands-free device 230 into the storing unit 216 (step S510).

In this way, the portable terminal device 210 and the hands-free device 230 exchange their MAC addresses, so that they can specify each other as a communication target device.

When the user presses one of the operational buttons of the operating unit 233 of the hands-free device 230 to display a registration screen (step S512), the operating unit 233 outputs a signal. In accordance with this signal, the control unit 236 has the display unit 239 display the registration screen (step S514). This registration screen is displayed to prompt the user to register a target communication device, that is, a communication link destination for the hands-free device 230.

Figure 16:
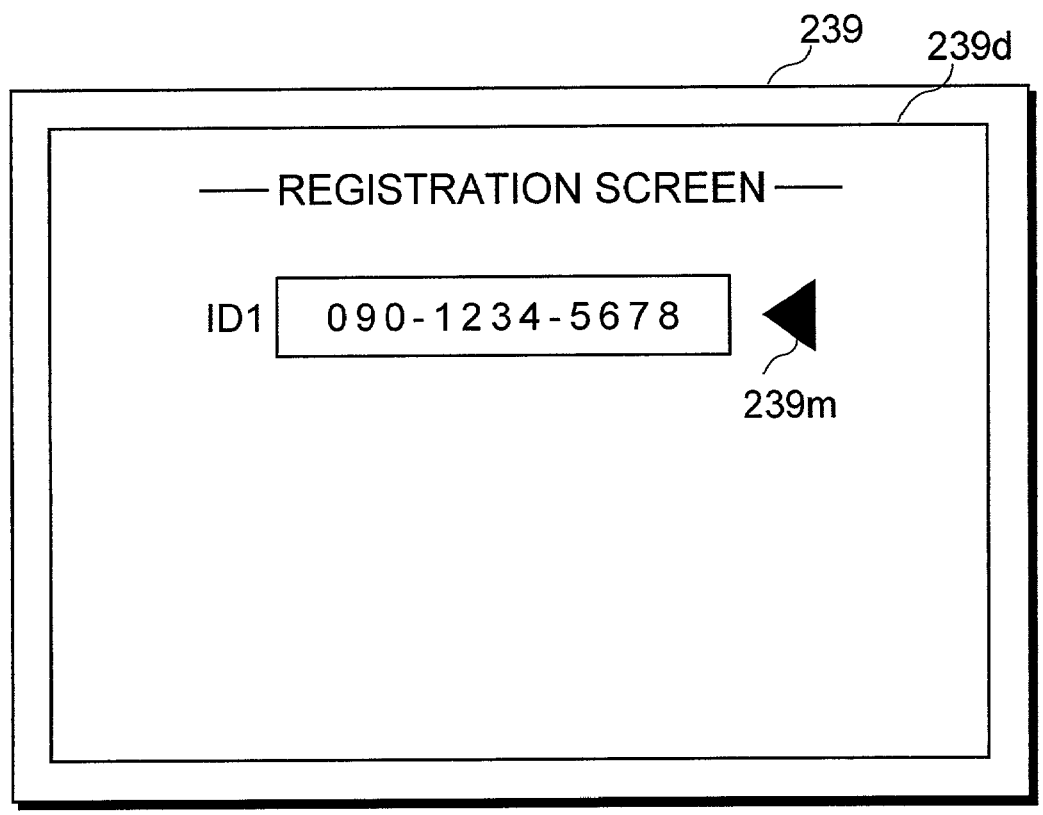
FIG. 16 shows a registration screen which is used for the second embodiment.

FIG. 16 shows an example of a registration screen 239d which is displayed by the display unit 239.

On the registration screen 239d, "ID1" indicating the personal ID stored in the storing unit 232 is displayed next to "090-1234-5678" indicating the user information stored in the storing unit 232.

The displayed personal ID and user information have been read by the control unit 236 from the storing unit 232 in accordance with the signal from the operating unit 233. On the registration screen 239d, a triangular candidate mark 239m is displayed to the right of the user information. The candidate mark 239m indicates user information of a candidate device to be registered.

While viewing the registration screen 239d, the user operates an "ENTER" button 233b, and, if necessary, a move button 233a and a "CANCEL" button 233c (see FIG. 17) which are included in the operational buttons of the operating unit 233 to register the displayed communication target device of the hands-free device 230.

Figure 17:
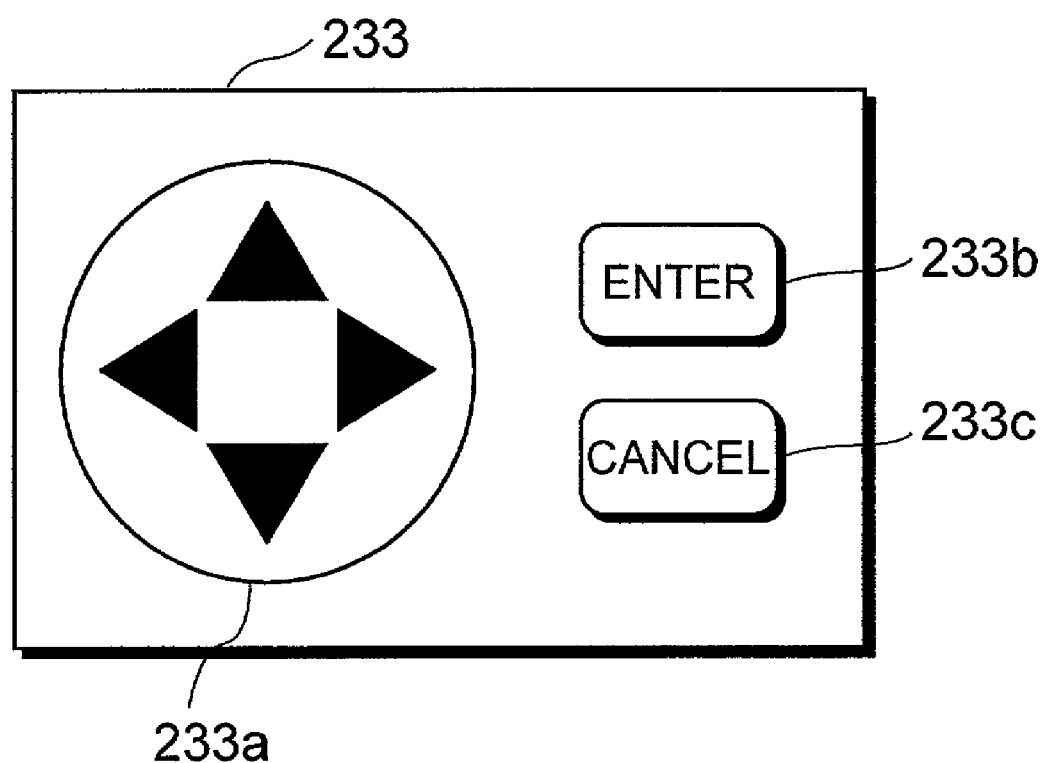
FIG. 17 is a front view of a part of an operating unit that includes a move button, an "ENTER" button, and a "CANCEL" button.

FIG. 17 is a front view of a part of the operating unit 233 which includes a move button 233a, the "ENTER" button 233b, and the "CANCEL" button 233c.

The move button 233a is pressed to move the candidate mark 239m and to change user information indicated by the candidate mark 239m. The "ENTER" button 233b is pressed to have the operating unit 233 output a registration signal to register the user information indicated by the candidate mark 239m to the control unit 236. The "CANCEL" button 233c is pressed to have the operating unit 233 output a cancel signal to clear the registration screen 239d to the control unit 236. When the registration screen 239d includes a single set of user information as shown in FIG. 16, pressing the move button 233a does not move the candidate mark 239m, which remains to indicate the same user information. It is alternatively possible to provide a touch panel function to the display unit 239 to make the display unit 239 function as the operating unit 233 as described in the first embodiment. In this case, the display unit 239 displays the move button 233a, the "ENTER" button 233b, and the "CANCEL" button 233c on the registration screen 239d.

When the user presses the "ENTER" button 233b, the operating unit 233 outputs a registration signal to instruct registration to the control unit 236 (step S516). This registration signal corresponds to the registration trigger signal described in the first embodiment.

Upon receiving the registration signal, the control unit 236 associates the personal ID in the storing unit 232, and the MAC address and user information obtained in step S510 with one another to produce personal registration data 232d, and registers the produced personal registration data 232d in the storing unit 232. That is to say, the control unit 236 and the storing unit 232 make up a means for registering an address of the portable terminal device 210.

Figure 18:
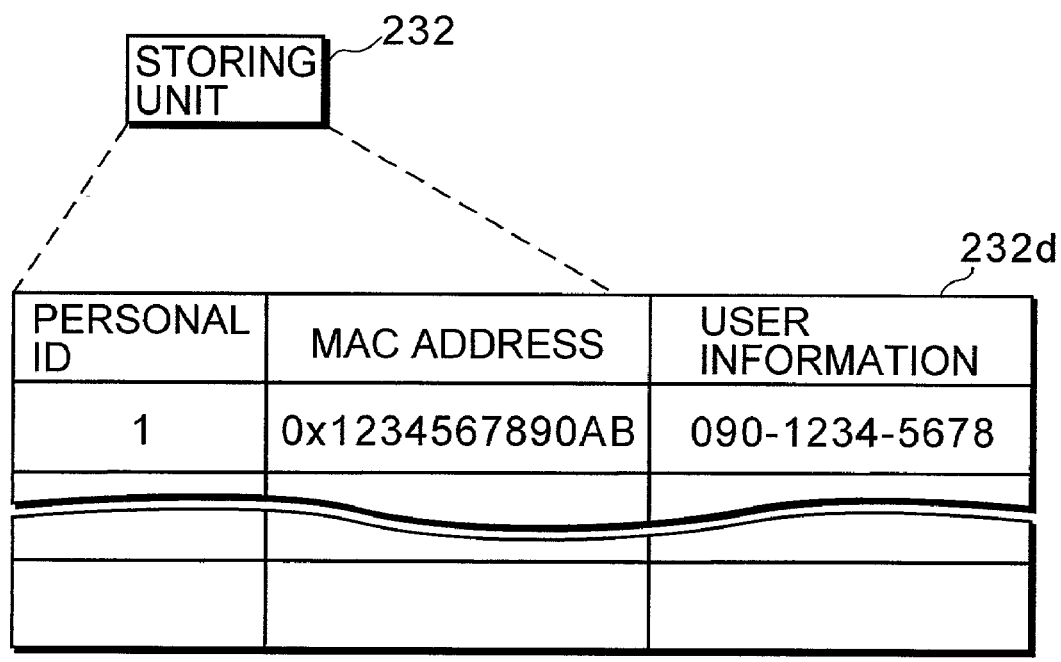
FIG. 18 is a table showing personal registration data for the second embodiment.

FIG. 18 is a table showing the personal registration data 232d.

In this personal registration data 232d, the personal ID "1", the MAC address "0x1234567890AB", and the user information "090-1234-5678" are associated with one another.

In this way, the portable terminal device 210 with the user information "090-1234-5678" is registered in the hands-free device 230 as a communication link destination of the hands-free device 230 (step S518).

Figure 19:
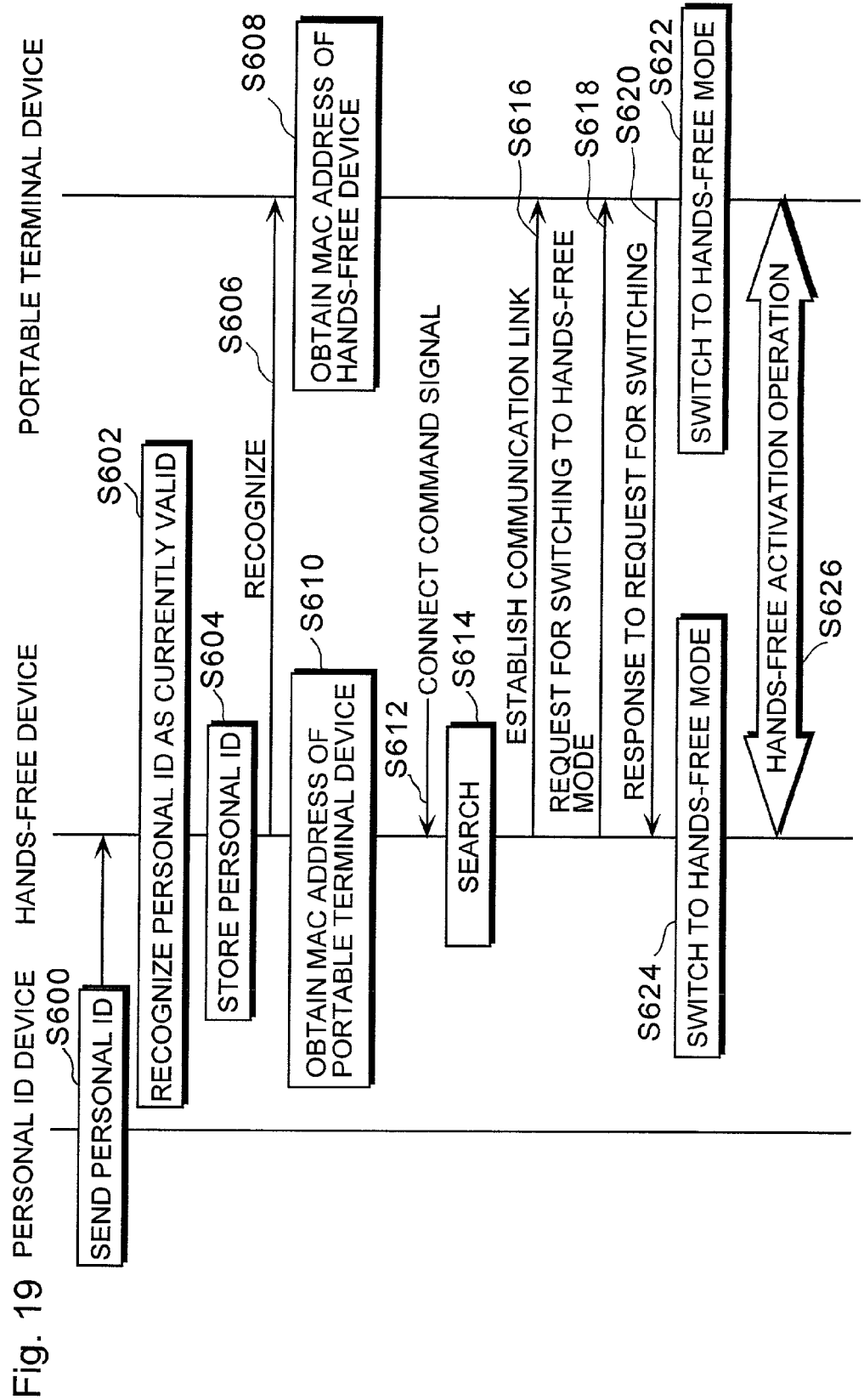
FIG. 19 is a sequence diagram showing an operation which is performed by the hands-free communication system to specify a portable terminal device.

With reference to FIG. 19, the following sequentially describes an operation that ends with the hands-free activation operation which is performed by the registered portable terminal device 210 and the hands-free device 230 when the driver brings the portable terminal device 210 into the automobile.

FIG. 19 is a sequence diagram showing this operation of the hands-free communication system 200.

As described for FIG. 15, the driver operates an operational button on the personal ID device 260 to get into the automobile. The personal ID device 260 then transmits the stored personal ID "1" and the unlock signal (step S600).

The control unit 236 of the hands-free device 230 receives this personal ID, recognizes the personal ID as currently valid (step S602), and places the personal ID into the storing unit 232 (step S604). Here, when the received personal ID is already registered in the personal registration data 232d in the storing unit 232, the control unit 236 may register a flag indicating this personal ID as valid into the personal registration data 232d (see FIG. 28).

When the user unlocks the car doors and gets into the automobile while carrying the portable terminal device 210, the portable terminal device 210 enters the communicable range of the hands-free device 230. The control unit 236 of the hands-free device 230 then recognizes the portable terminal device 210 as a device with which the hands-free device 230 can communicate (step S606).

Consequently, the hands-free device 230 sends its MAC address to the portable terminal device 210, and the portable terminal device 210 sends its MAC address and user information to the hands-free device 230 (steps S608 and S610).

When the control unit 236 of the hands-free device 230 receives, at this point, a connect command signal to establish a communication link (step S612), the control unit 236 searches the personal registration data 232d in the storing unit 232 for a currently valid personal ID, that is, the personal ID "1" (step S614).

This connect command signal is outputted when the hands-free device 230 and the portable terminal device 210 are required to conduct the hands-free activation operation. For instance, the connect command signal is outputted by the operating unit 233 of the hands-free device 230 when the user operates its operational button instructing the output of the signal. Alternatively, the connect command signal may be outputted when the automobile engine is started as in the first embodiment.

After finding the personal ID "1" in the personal registration data 232d, the control unit 236 reads the MAC address "0x1234567890AB" which is associated with the found personal ID "1", and specifies, as a communication target device, a device (i.e., the portable terminal device 210) that has the read address. The control unit 236 then establishes a Bluetooth communication link between the communication unit 231 of the hands-free device 230 and the terminal communication unit 211 of the portable terminal device 210 (step S616). In this way, the control unit 236 functions as a means for specifying a communication target device for the hands-free device 230.

When the communication link is established, the hands-free device 230 and the portable terminal device 210 switch to the hands-free mode to enable the hands-free activation operation.

More specifically, the control unit 236 requests, via the communication unit 231, the portable terminal device 210 to switch to the hands-free mode (step S618).

The terminal control unit 212 of the portable terminal device 210 receives this request via the terminal communication unit 211, and notifies the hands-free device 230 that the portable terminal device 210 is going to switch to the hands-free mode (step S620).

Following this, both the portable terminal device 210 and the hands-free device 230 switch to the hands-free mode (steps S622 and S624).

The portable terminal device 210 and the hands-free device 230 then perform the hands-free activation operation that activates the microphone 237 and the speaker 238 of the hands-free device 230 so as to enable the hands-free communication (step S626).

As has been described, the portable terminal device 210 is first associated with a personal ID of the personal ID device 260 and is then registered in the hands-free device 230 as a communication link destination of the hands-free device 230. This allows the hands-free device 230 to specify the registered portable terminal device 210 as its communication target device and to establish the communication link with the portable terminal device 230 when the hands-free communication is necessary. That is to say, the hands-free device 230 can select a user from a plurality of users who have the personal ID devices 260.

With the above examples described based on FIGS. 15 and 19, only one device is registered as a communication link destination in the hands-free device 230, although a plurality of devices may be registered.

The following describes an example in which three portable terminal devices 210 are registered in the hands-free device 230, and a communication link is established between one of the portable terminal devices 210 and the hands-free device 230.

Figure 20:
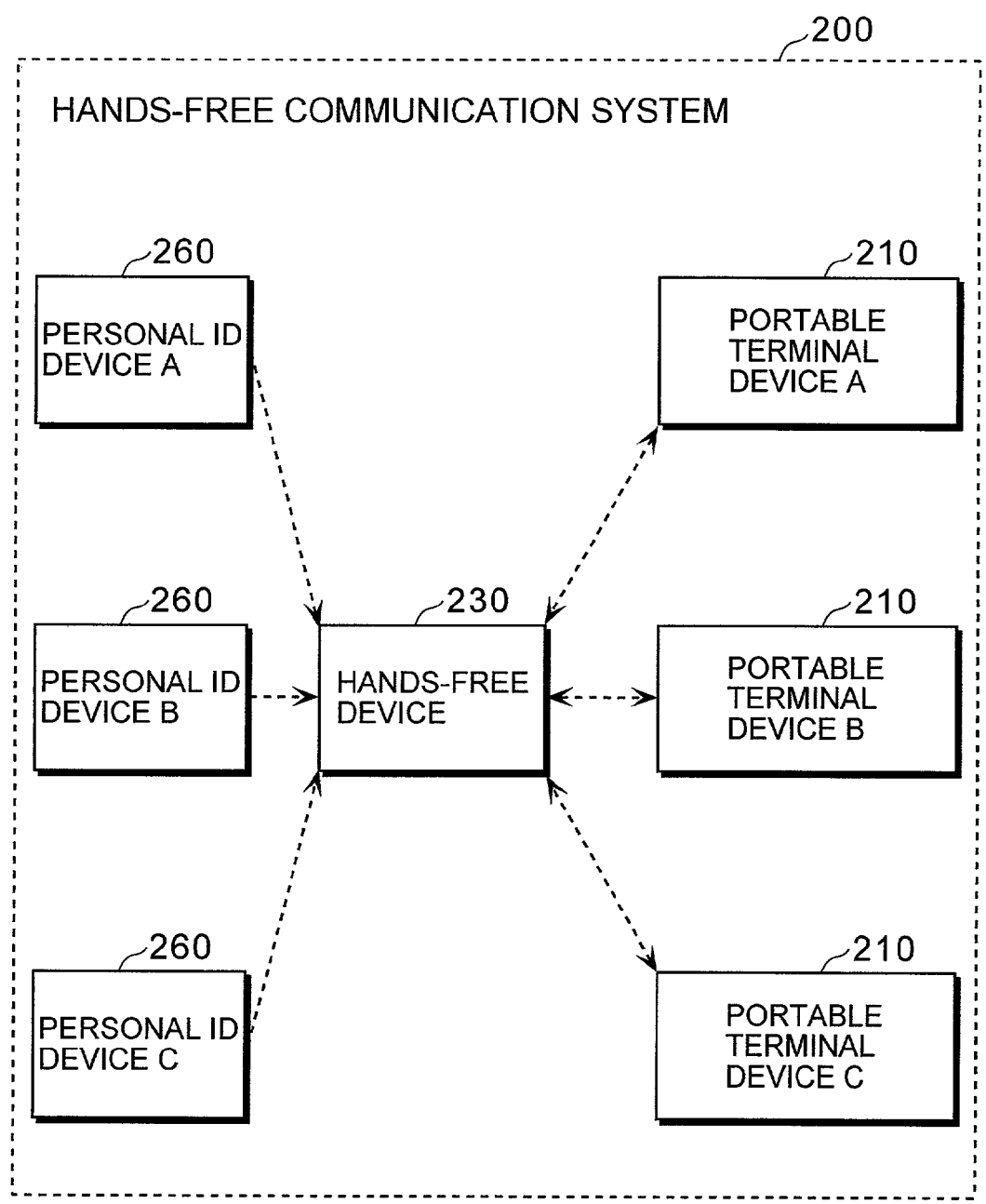
FIG. 20 shows a configuration of the hands-free communication system, for which three portable terminal devices are registered in a hands-free device for the second embodiment.

FIG. 20 shows a configuration of the hands-free communication system 200 for which three portable terminal devices 210 are registered in the hands-free device 230.

This hands-free communication system 200 includes the hands-free device 230, three personal ID devices 260, and the three portable terminal devices 210. For the sake of distinction, the three portable terminal devices 210 are called portable terminal devices A210, B210, and C210, and similarly the three personal ID devices 260 are called personal ID devices A260, B260, and C260.

Each of the personal ID devices A260, B260, and C260 is provided to a different user, and stores a different personal ID. Specifically, the personal ID devices A260, B260, and C260 store personal IDs "1", "2", and "3", respectively.

The portable terminal devices A210, B210, and C210 also store different MAC addresses and user information in their respective storing units 216.

Figure 21A:
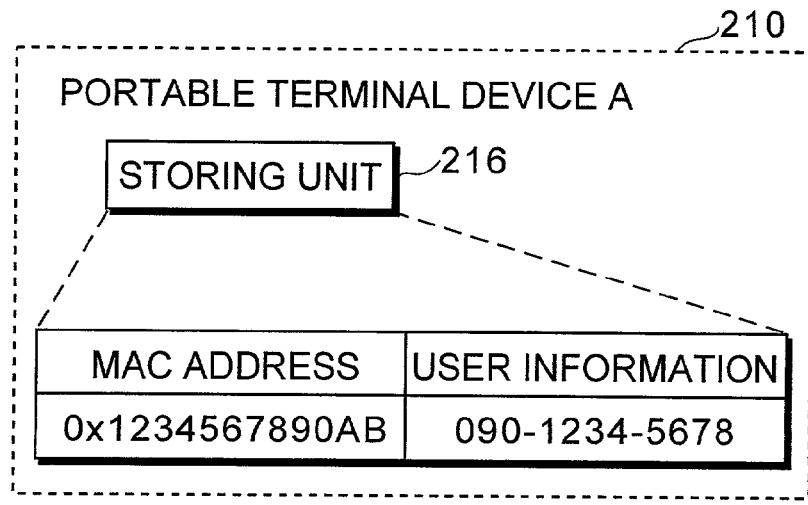
FIGS. 21A–21C are tables showing the contents of information stored in a storing unit of each portable terminal device.
Figure 21B:
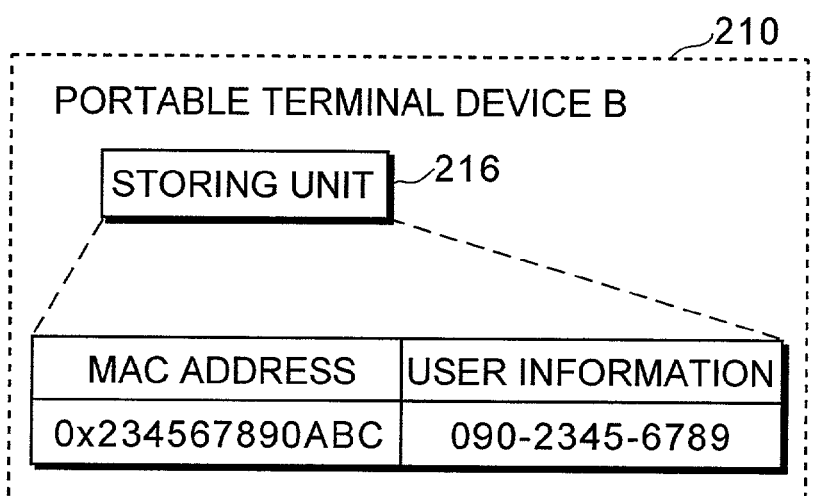
Figure 21C:
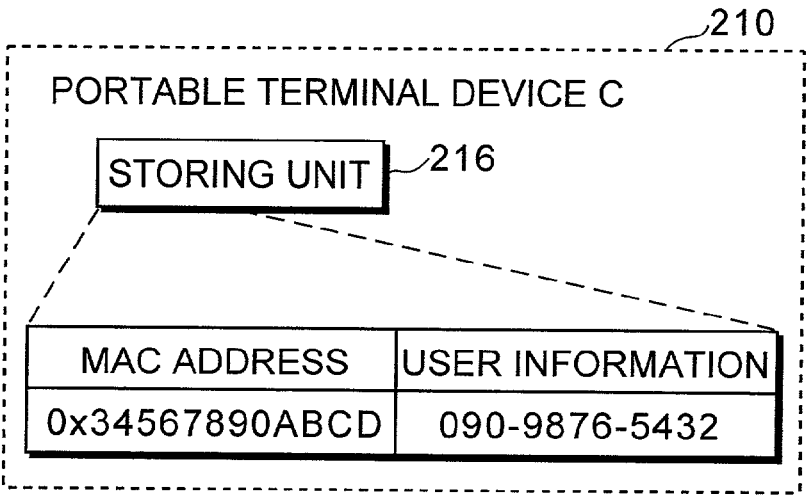

FIGS. 21A–21C are tables showing the contents of the storing units 216 of the portable terminal devices A210, B1210, and C210, respectively.

As shown in FIG. 21A, the storing unit 216 of the portable terminal device A210 stores the MAC address "0x1234567890AB" and user information "090-1234-5678" that are associated with each other. Similarly, as shown in FIG. 21B, the storing unit 216 of the portable terminal device B210 stores the MAC address "0x234567890ABC" and user information "090-2345-6789" that are associated with each other. As shown in FIG. 21C, the storing unit 216 of the portable terminal device C210 stores the MAC address "0x34567890ABCD" and user information "090-9876-5432" that are associated with each other.

The portable terminal device A210 and the personal ID device A260 are used by a user A. Similarly, the portable terminal device B210 and the personal ID device B260 are used by another user B, and the portable terminal device C210 and the personal ID device C260 are used by another user C.

Here, assume that the user A wishes to register his portable terminal device A210 in the hands-free device 230 as the communication target device of the hands-free device 230. Then, the user A performs registration using his personal ID device A260, as shown in FIG. 15.

This registration produces the personal registration data 232d, as shown in FIG. 18, which associates the personal ID "1", the MAC address "0x1234567890AB", and the user information "090-1234-5678" with one another in the storing unit 232 of the hands-free device 230.

Here, assume that the user B also wishes to register his portable terminal device B210 in the hands-free device 230 after the user A. Then, the user B performs registration by using the personal ID device B260, as shown in FIG. 15.

Figure 22:
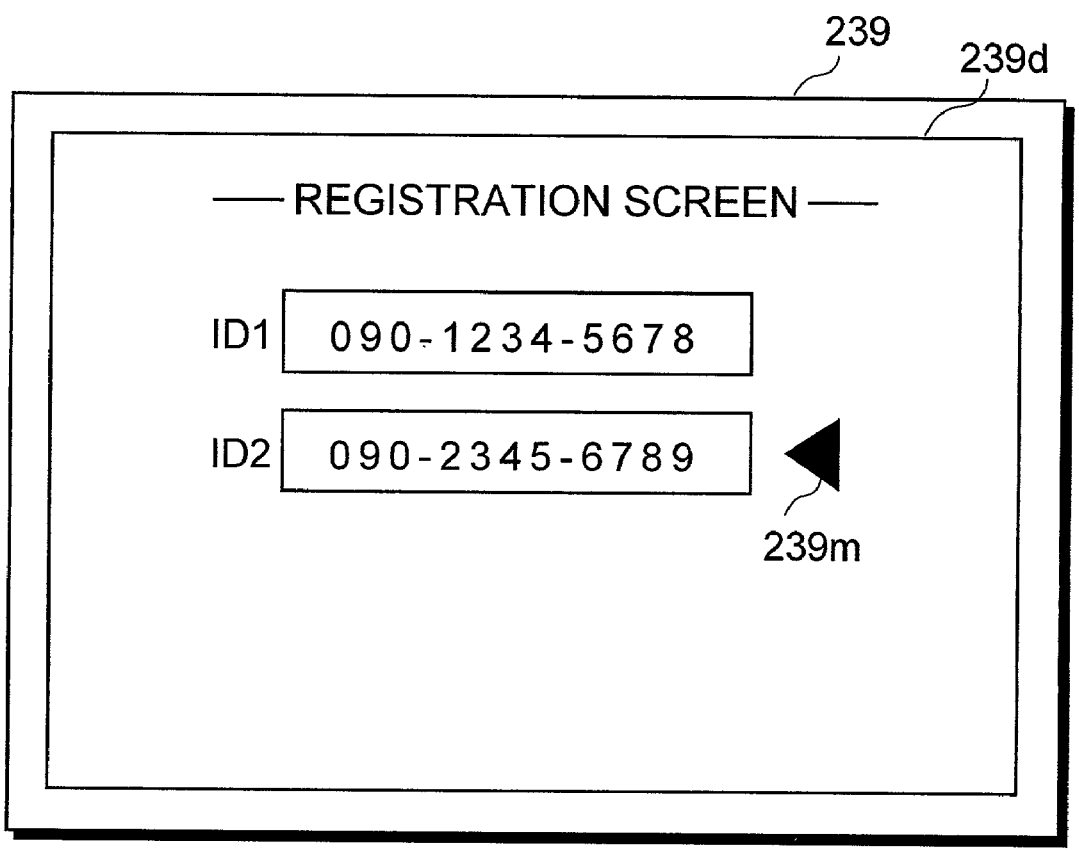
FIG. 22 shows another registration screen which is used for the second embodiment.

Consequently, in step S514 of FIG. 15, the display unit 239 displays two sets of user information on the registration screen 239d as shown in FIG. 22.

FIG. 22 shows the registration screen 239. Displayed on the first line of the registration screen 239d are the personal ID "ID1" and the associated user information "090-1234-5678", which have been earlier registered in the personal registration data 232d. Also displayed on the second line are the user information "090-2345-6789" of the portable terminal device B210, and the personal ID "ID2" of the personal ID device B260.

While viewing this registration screen 239d, the user B operates the move button 233a of the operating unit 233 to have the candidate mark 239m indicate the user information "090-2345-6789", and presses the "ENTER" button 233b. As a result, the operating unit 233 outputs the registration signal, so that the control unit 236 associates the personal ID of the personal ID device B260, and the MAC address and the user information of the portable terminal device B210 with one another, and registers them in the personal registration data 232d in the storing unit 232. This updates the personal registration data 232d. In this way, the operating unit 233 functions as a means for selecting user information to be registered.

Figure 23:
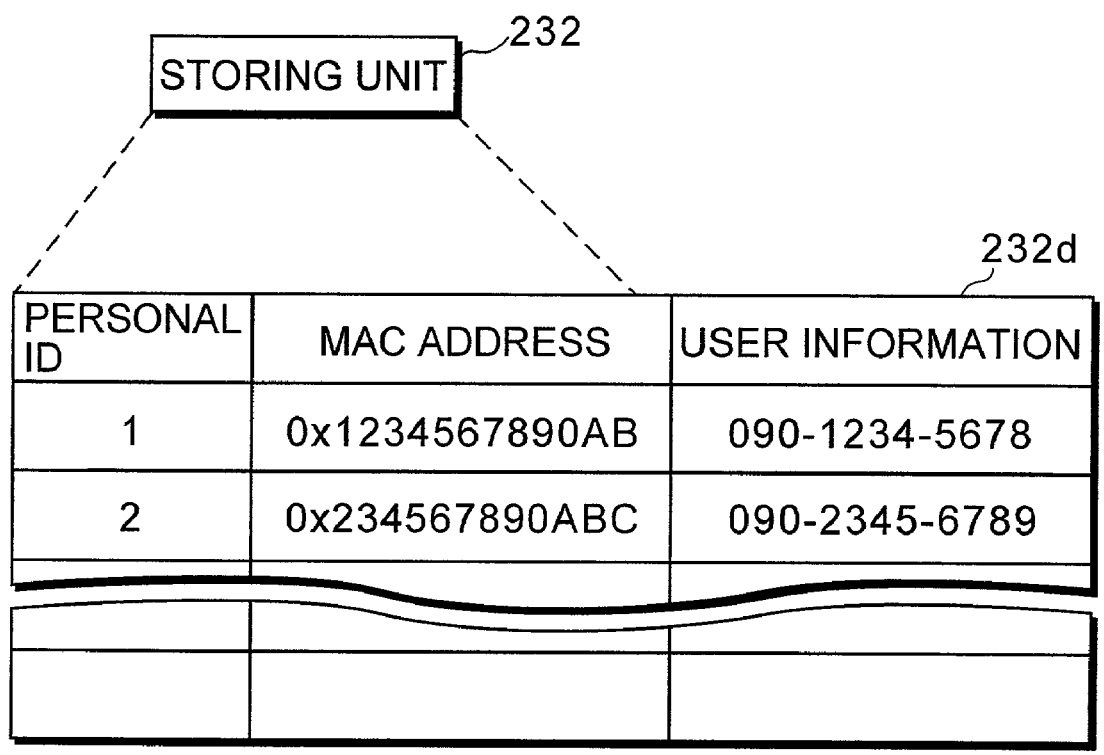
FIG. 23 is a table showing personal registration data for the second embodiment.

FIG. 23 is a table showing the updated personal registration data 232d.

In this personal registration data 232d, the personal ID "1" of the personal ID device A260, and the MAC address "0x1234567890AB" and the user information "090-1234-5678" of the portable terminal device A210 are associated with one another. Further, the personal ID "2" of the personal ID device B260, and the MAC address "0x234567890ABC" and the user information "090-2345-6789" of the portable terminal device B210 are associated with one another.

As a result of such updating of the personal registration data 232d, the portable terminal devices A210 and B210 are registered in the hands-free device 230 as its communication target devices.

Here, assume that the user C also wishes to register his portable terminal device C210 in the hands-free device 230 after the users A and B. Then, the user C performs registration by using the personal ID device C260 as shown in FIG. 15.

Figure 24:
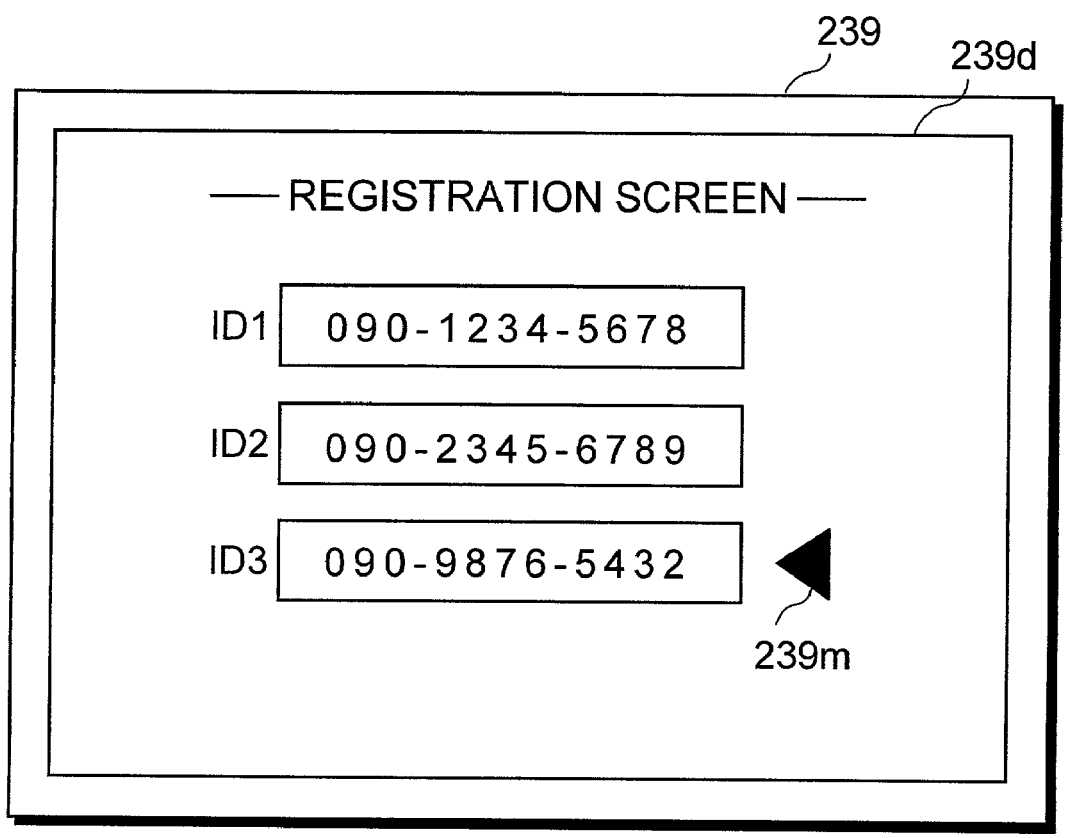
FIG. 24 shows another registration screen which is displayed for the second embodiment.

Then, in step S514 of FIG. 15, the display unit 239 displays three sets of user information on the registration screen 239d as shown in FIG. 24.

FIG. 24 shows the registration screen 239d. Displayed on the first and second lines on the registration screen 239d are the already registered personal IDs and associated user information of the portable terminal devices A210 and B210. Also displayed on the third line are the user information "090-9876-5432" of the portable terminal device C210, and the personal ID "ID3" of the personal ID device C260.

While viewing such a registration screen 239d, the user C operates the move button 233a of the operating unit 233 to have the candidate mark 239m indicate the user information "090-9876-5432", and presses the "ENTER" button 233b. As a result, the operating unit 233 outputs the registration signal, so that the control unit 236 associates the personal ID of the personal ID device C260, and the MAC address and the user information of the portable terminal device C210 with one another, and registers them in the personal registration data 232d in the storing unit 232 so as to update the personal registration data 232d.

Figure 25:
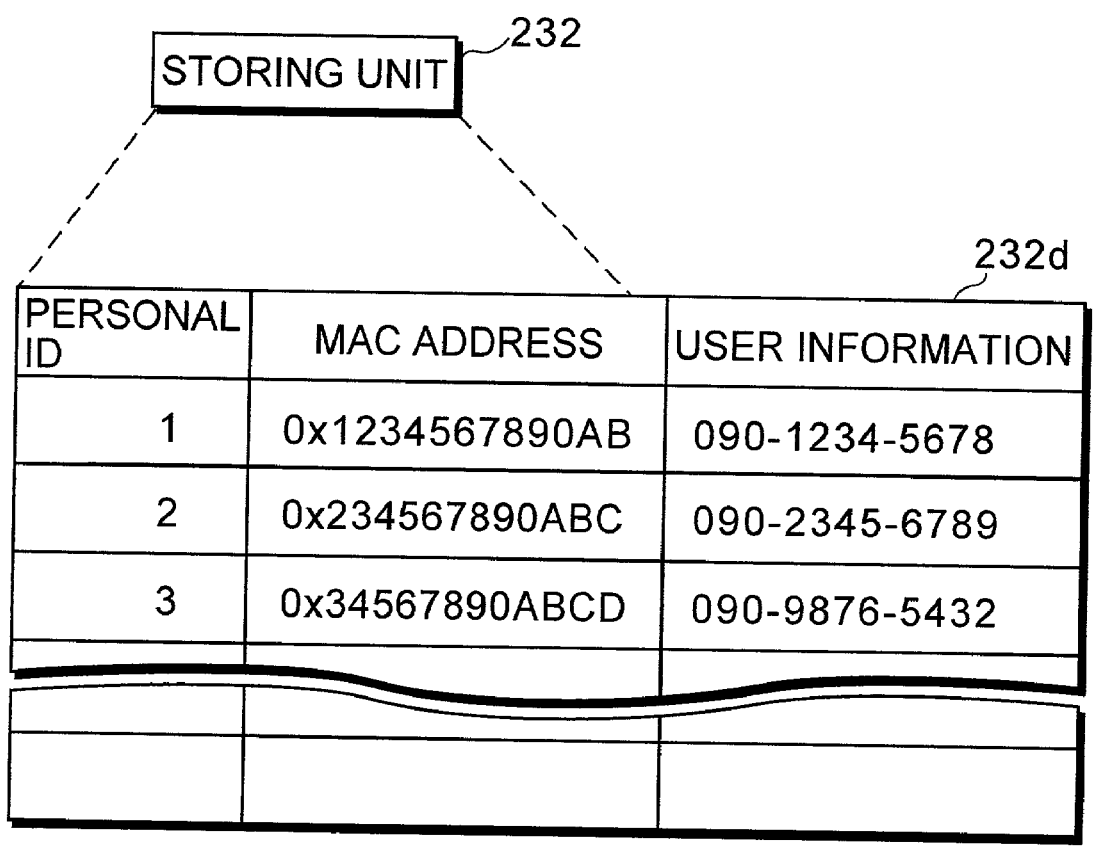
FIG. 25 is a table showing the personal registration data that has been updated.

FIG. 25 is a table showing the updated personal registration data 232d.

In this personal registration data 232d, the personal ID "1" of the personal ID device A260, and the MAC address "0x1234567890AB" and the user information "090-1234-5678" of the portable terminal device A210 are associated with one another. Further, the personal ID "2" of the personal ID device B260, and the MAC address "0x234567890ABC" and the user information "090-2345-6789" of the portable terminal device B210 are associated with one another. Moreover, the personal ID "3" of the personal ID device C260, and the MAC address "0x34567890ABCD" and the user information "090-9876-5432" of the portable terminal device C210 are associated with one another.

As a result of such updating of the personal registration data 232d, the portable terminal devices A210, B210, and C210 are registered in the hands-free device 230 as its communication target devices.

Figure 26:
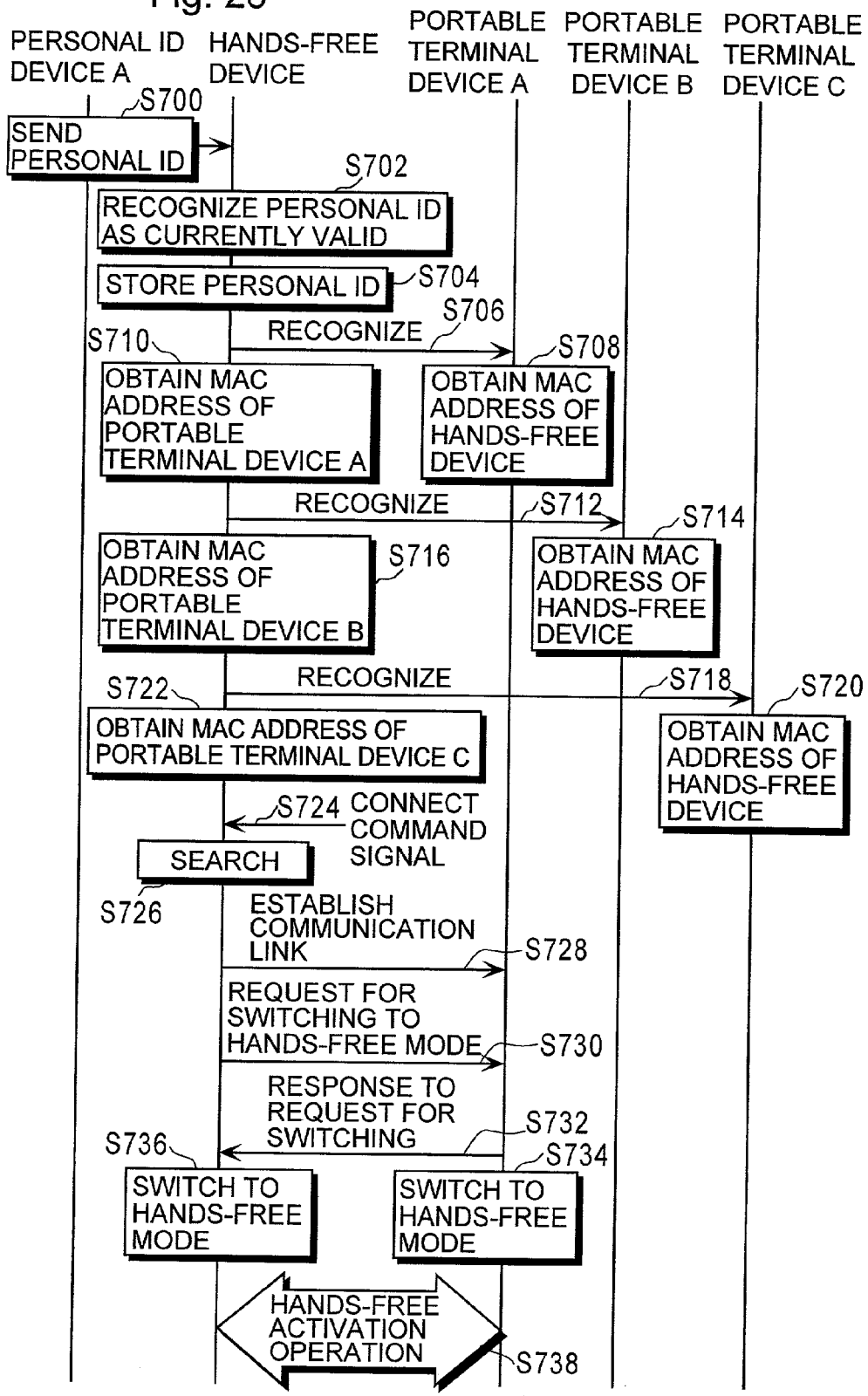
FIG. 26 is a sequence diagram showing an operation which is performed by the hands-free communication system to specify a portable terminal device.

With reference to FIG. 26, the following sequentially describes an operation that ends with the hands-free activation operation which is performed by one of the registered portable terminal devices A210–C210 and the hands-free device 230 when the users A, B, and C bring their portable terminal devices A210–C210 into the automobile.

FIG. 26 is a sequence diagram showing this operation of the hands-free communication system 200.

For getting into the automobile, the user A operates his personal ID device A260, so that the personal ID device A260 transmits the stored personal ID "1", and the unlock signal (step S700).

The control unit 236 of the hands-free device 230 receives this personal ID, recognizes the personal ID as currently valid (step S702), and places the personal ID into the storing unit 232 (step S704).

When the user A carrying the portable terminal device A210 gets into the automobile, the portable terminal device A210 enters the communicable range of the hands-free device 230. As a result, the control unit 236 of the hands-free device 230 recognizes the portable terminal device A210 as a device with which the hands-free device 230 can communicate (step S706).

Consequently, the hands-free device 230 sends its MAC address to the portable terminal device A210, and the terminal device A210 sends its MAC address and user information to the hands-free device 230 (steps S708 and S710).

When the user B carrying his personal ID device B260 and the portable terminal device B210 also gets into the automobile, the portable terminal device B210 enters the communicable range of the hands-free device 230. As a result, the control unit 236 of the hands-free device 230 recognizes the portable terminal device B210 as a device with which the hands-free device 230 can communicate (step S712). Note that the user B does not use his personal ID device B260 here because he is not going to drive the automobile.

Consequently, the hands-free device 230 sends its MAC address to the portable terminal device B210, and the terminal device B210 sends its MAC address and user information to the hands-free device 230 (steps S714 and S716).

When the user C carrying his personal ID device C260 and the portable terminal device C210 also gets into the automobile, the portable terminal device C210 enters the communicable range of the hands-free device 230. As a result, the control unit 236 of the hands-free device 230 recognizes the portable terminal device C210 as a device with which the hands-free device 230 can communicate (step S718). Note that the user C does not use his personal ID device C260 here because he is not going to drive the automobile.

Consequently, the hands-free device 230 sends its MAC address to the portable terminal device C210, and the terminal device C210 sends its MAC address and user information to the hands-free device 230 (steps S720 and S722).

Here, assume that the control unit 236 of the hands-free device 230 receives the connect command signal at this point (step S724). Then, the control unit 236 searches the personal registration data 232d in the storing unit 232 for the personal ID "1" that has been recognized in step S704 as currently valid (step S726).

In the current personal registration data 232d shown in FIG. 25, three personal IDs of the personal ID devices A260–C260 and MAC addresses and user information of the three portable terminal devices A210–C210 are registered. The control unit 236 then finds the valid personal ID "1" in this registration data 232d, and reads the MAC address "0x1234567890AB" which is associated with the found personal ID "1", and specifies, as a communication target device, the portable terminal device A210 that has the read address. The control unit 236 then establishes a Bluetooth communication link between the communication unit 231 of the hands-free device 230 and the terminal communication unit 211 of the portable terminal device A210 (step S728).

When the communication link is established in this way, the hands-free device 230 and the portable terminal device A210 switch to the hands-free mode to enable the hands-free activation operation.

More specifically, the control unit 236 requests, via the communication unit 231, the portable terminal device A210 to switch to the hands-free mode as in the operation shown in FIG. 19 (step S730).

The terminal control unit 212 of the portable terminal device A210 receives this request via the terminal communication unit 211, and notifies the hands-free device 230 that the terminal device A210 is going to switch to the hands-free mode (step S732).

Following this, both the portable terminal device A210 and the hands-free device 230 switch to the hands-free mode (steps S734 and S736).

The portable terminal device A210 and the hands-free device 230 then perform the hands-free activation operation by activating the microphone 237 and the speaker 238 of the hands-free device 230, so that the hands-free communication can be conducted (step S738).

For the second embodiment, a plurality of portable terminal devices 210 are registered beforehand in the hands-free device 230 as its communication link destinations, with each portable terminal device 210 being associated with a personal ID of a personal ID device 260. When the user wishes to conduct the hands-free communication, the hands-free device 230 selects one of a plurality of the registered portable terminal devices 210, and establishes the communication link with the selected portable terminal device 210. That is to say, the hands-free device 230 automatically selects, as its communication target, a user operating on a personal ID device 260 out of a plurality of users without requiring the user to perform any troublesome operations. Also, with the present hands-free communication system 200, the display unit 239 of the hands-free device 230 displays, for its operator, information regarding users and their portable terminal devices 210 whose addresses are already obtained by the hands-free device 230. The operator can therefore select a desired user out of such users and register an address of a portable terminal device 210 which is associated with the selected user into the hands-free device 230.

The following describes an operation of a plurality of portable terminal devices 210 and a plurality of hands-free devices 230 when one of the portable terminal devices 210 receives a call. Here, the plurality of portable terminal devices 210 are registered in the plurality of hands-free devices 230 and are within the communicable ranges of all of the hands-free devices 230.

Figure 27:
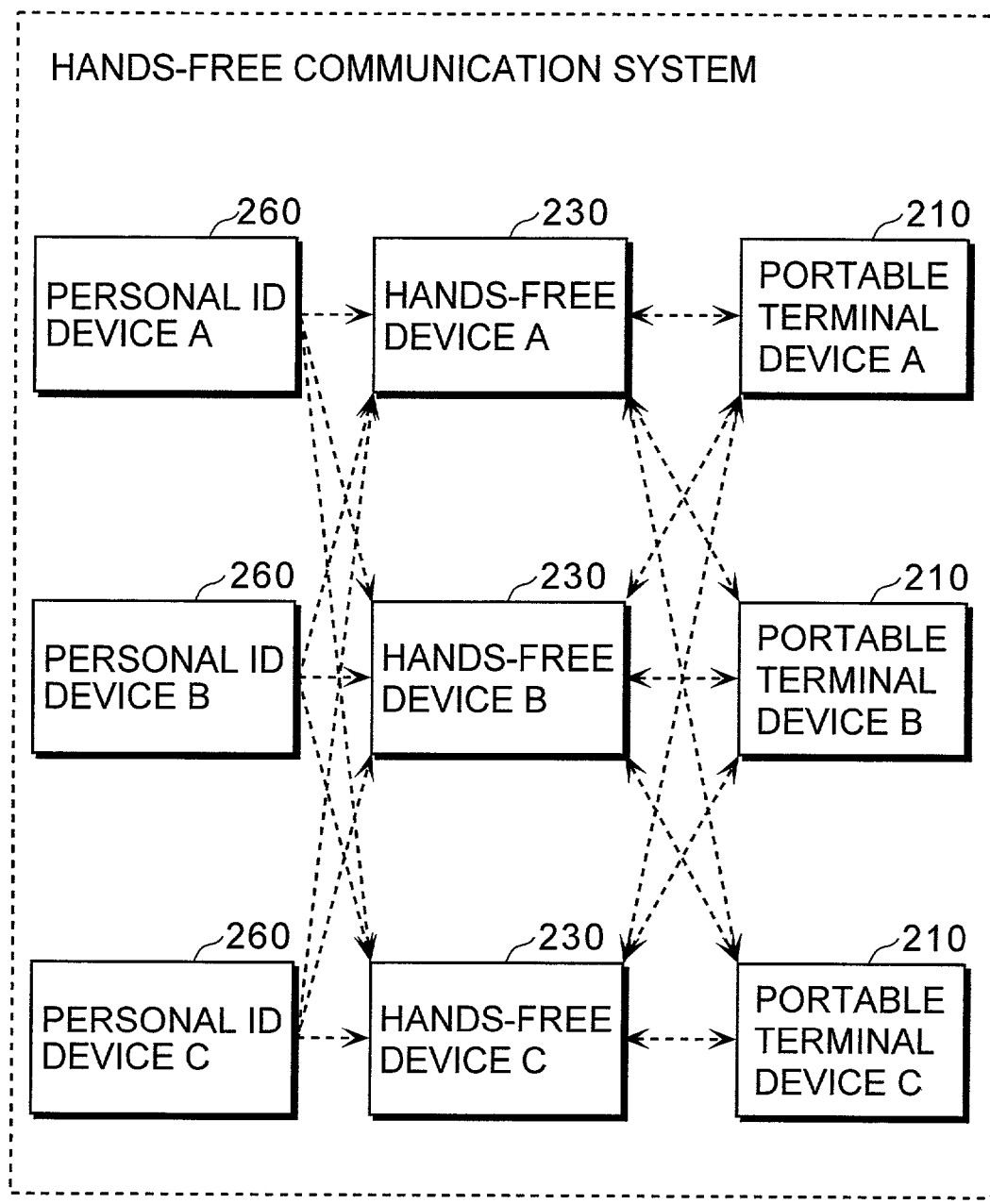
FIG. 27 shows a configuration of the hands-free communication system in which three portable terminal devices exist within the communicable ranges of three hands-free devices.

FIG. 27 shows a state of a hands-free communication system 200 in which three portable terminal devices A210, B210, and C210 are within the communicable ranges of the three hands-free devices A230, B230, and C230.

The portable terminal devices A210–C210 are registered in the hands-free devices A230–C230 as their communication target devices in accordance with the registration operation described with reference to FIG. 15.

That is to say, the storing unit 232 of each of the hands-free devices A230–C230 stores the personal registration data 232d that associates three personal IDs with different MAC addresses and user information of the three portable terminal devices A230–C230 as shown in FIG. 25.

For ease of explanation, assume that the user A carrying the portable terminal device A210 gets into an automobile, which is equipped with the hands-free device A230, by using the personal ID device A260 and that the user B carrying the portable terminal device B210 gets into an automobile equipped with the hands-free device B230 by using the personal ID device B260, so that the three personal ID devices A260–C260, the hands-free devices A230–C230, and the portable terminal devices A210–C210 are all present within a range in which one device can conduct Bluetooth communication with another.

When getting into the automobile equipped with the hands-free device A230, the user A operates the personal ID device A260, which then outputs the personal ID "1".

The control unit 236 of the hands-free device A230 recognizes this personal ID "1" as currently valid, and searches the personal registration data 232d in the storing unit 232 for this personal ID. Upon finding the personal ID "1", the control unit 236 associates the aforementioned flag shown as valid (hereafter called a "valid flag") with the found personal ID "1", and registers them in the personal registration data 232d so as to indicate that this personal ID is currently valid.

The control unit 236 may clear the registered valid flag when a predetermined time passes after the registration, or when the unlock signal outputted by the personal ID device 260 unlocks the car doors. Instead of registering the valid flag, it is possible to store information indicating that the currently valid personal ID is the personal ID "1" in the storing unit 232 as described above.

Figure 28A:
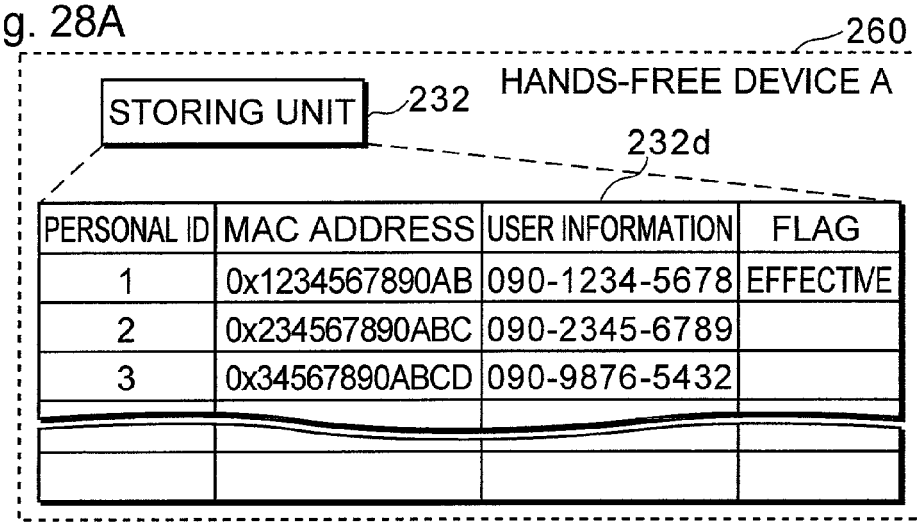
FIGS. 28A–28C are tables showing personal registration data stored in the three hands-free devices.

FIG. 28A is a table showing the personal registration data 232d stored in the hands-free device A230 when the user A is in the automobile equipped with the hands-free device A230.

As shown in FIG. 28A, the personal registration data 232d associates the valid flag, the personal ID "1", and the MAC address "0x1234567890AB" and user information "090-1234-5678" of the portable terminal device A210 with one another.

After this, assume that the user B gets into another automobile equipped with the hands-free device B230 by operating the personal ID device B260 to have the personal ID "2" outputted.

Then, the control unit 236 of the hands-free device B230 recognizes this personal ID "2" as currently valid, and searches the personal registration data 232d in the storing unit 232 for this personal ID. Upon finding the personal ID "2", the control unit 236 associates the valid flag with the found personal ID "2" and registers them in the personal registration data 232d.

Figure 28B:
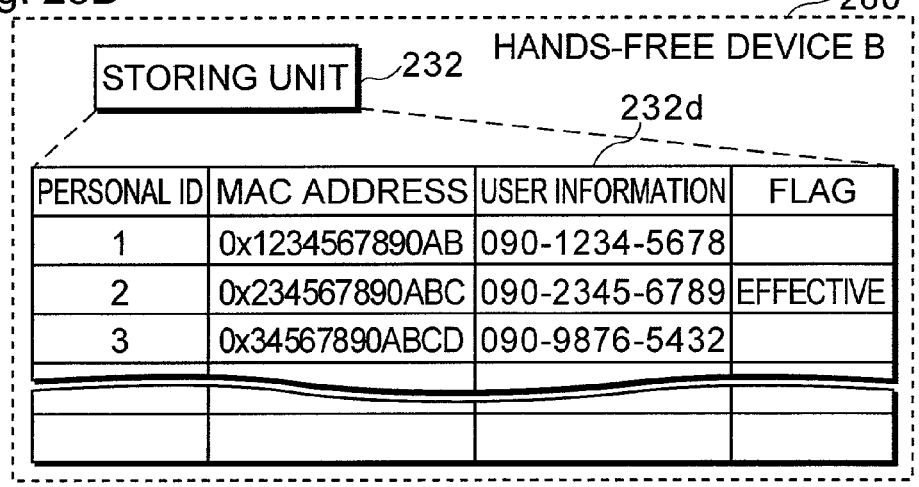

FIG. 28B is a table showing the personal registration data 232d stored in the hands-free device B230 when the user B is in the automobile equipped with the hands-free device B230.

As shown in FIG. 28B, the personal registration data 232d associates the valid flag, the personal ID "2", and the MAC address "0x234567890ABC" and user information "090-2345-6789" of the portable terminal device B210 with one another.

On the other hand, nobody is going to get into the automobile equipped with the hands-free device C230. As a result, personal registration data 232d stored in the storing unit 232 of the hands-free device C230 only stores data that has been registered earlier.

Figure 28C:
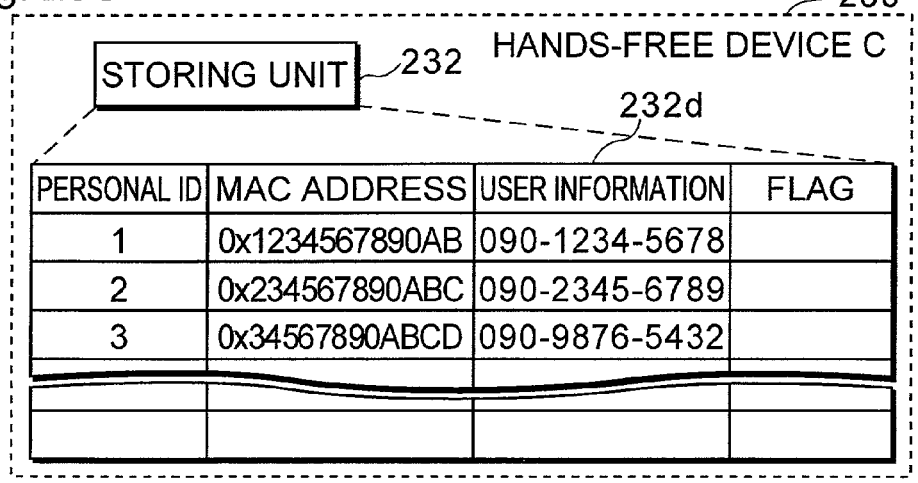

FIG. 28C is a table showing this personal registration data 232d stored in the hands-free device C230. This personal registration data 232d indicates that no valid flag is registered, and therefore none of the personal IDs are currently valid.

After this, in a similar way to steps S706–S722 shown in FIG. 26, the hands-free devices A230–C230 send their MAC addresses to the portable terminal devices A210–C210, while the portable terminal devices A210–C210 also send their MAC addresses and user information to the hands-free devices A230–C230. Consequently, each of the hands-free devices A230–C230 and the portable terminal devices A210–C210 has a plurality of MAC addresses of communication target devices.

When the connect command signal is inputted to the control unit 236 of any of the hands-free devices A230–C230 at this point as shown in step S724 in FIG. 26, the hands-free device 230 receiving the connect command signal searches its personal registration data 232d for a valid personal ID indicated by the valid flag, and establishes a communication link with a portable terminal device 210 which is associated with the valid personal ID in the similar way to that shown in FIG. 26.

On the other hand, when one of the portable terminal devices A210–C210, e.g., the portable terminal device A210, receives a call before one of the hands-free devices 230A–230C receives the connect command signal, the portable terminal device A210 performs the following operation to establish a communication link with the hands-free device A230 alone that is present in the same automobile as the portable terminal device A210.

More specifically, upon receiving the call, the terminal control unit 212 of the portable terminal device A210 detects that the three hands-free devices A230–C230 exist in a communicable range of the portable terminal device A210, and sends a connect request signal requesting each hands-free device 230 to establish a communication link with the portable terminal device A210.

Each hands-free device 230 then judges from the sent connect request signal whether the MAC address of the requesting portable terminal device A210 is registered in the personal registration data 232d in its respective storing unit 232 and associated with a currently valid personal ID indicated by the valid flag.

More specifically, the control unit 236 of the hands-free device A230 searches the personal registration data 232d in the storing unit 232 shown in FIG. 28A for the MAC address of the requesting portable terminal device A210, and judges whether this MAC address is associated with the valid flag. Similarly, the control units 236 of the hands-free devices B230 and C230 search the personal registration data 232d shown in FIGS. 28B and 28C, respectively, for the MAC address of the requesting portable terminal device A210, and judge whether this MAC address is associated with the valid flag.

Consequently, the control unit 236 of the hands-free device A230 judges from the valid flag that the MAC address of the portable terminal device A210 is associated with the currently valid personal ID, and sends a connect response signal to the connect request signal.

As a result, the portable terminal device A210 that has received a call can establish a communication link with the hands-free device A230 alone in the same automobile even when other hands-free devices B230 and C230 exist within the communicable range of the portable terminal device A210.

The portable terminal device A210 may send the above connect request signal to the hands-free device A230 alone that stores the MAC address of portable terminal device A210 associated with the valid personal ID, although the above-described embodiment describes the portable terminal device A210 sending this connect request signal to all the hands-free devices A230–C230.

In more detail, before sending the connect request signal, the portable terminal device A210 may send, to all the hands-free devices A230–C230, an inquiry signal to make an inquiry about a registered MAC address which is associated with a currently valid personal ID. In response to this inquiry signal, each hands-free device 230 sends its MAC address to the portable terminal device A210, which then compares each sent MAC address with its own MAC address. Upon finding that the MAC address sent from the hands-free device A230 matches with its own MAC address, the portable terminal device A210 sends the connect request signal to only this hands-free device A230 alone.

In the above-described embodiment, it is only the hands-free device 230 that stores the personal registration data 232d. The communication link is then established between the hands-free device 230 and the portable terminal device 210 which is associated with the valid personal ID of the personal ID device 260. It is alternatively possible, however, for the portable terminal device 210 to perform the function of the hands-free device 230.

FIG. 29 shows the construction of the hands-free communication system 200 that includes such a portable terminal device 210 having the above function of the hands-free device 210.

This hands-free communication system 200 also includes the personal ID device 270 that outputs a personal ID similar to the personal ID device 260. The terminal control unit 212 of the portable terminal device 210 receives the personal ID from the personal ID device 270, and associates the received personal ID with a MAC address sent from the hands-free device 230 and stores them in the storing unit 216.

This enables the portable terminal device 210 to automatically select a hands-free device 230 which is associated with the personal ID sent from the personal ID device 270 out of a plurality of hands-free devices 230 within a communicable range so as to establish a communication link to the selected hands-free device 230. The personal ID device 260/270 may be a fingerprint authentication device that outputs fingerprint information of the user as the personal ID, or the personal ID device 260/270 may be a password input device that stores a password in advance and outputs the password as the personal ID.

According to the second embodiment, a personal ID, a MAC address, user information, and a valid flag are registered in the personal registration data 232d in the storing unit 232 of the hands-free device 230. In addition to such information, it is also possible to register a priority in the personal registration data 232d which is assigned to a communication target device that has a MAC address and user information.

The hands-free device 230 selects a communication target device to which the highest priority is assigned in the personal registration data 232d. Each priority is registered, for instance, by a user operation of the operating unit 233 of the hands-free device 230.

FIG. 30 is an example of a table showing the personal registration data 232d that contains such priorities.

This personal registration data 232d associates the following sets of data with one another: the personal ID "1"; the MAC address "0x1234567890AB" and the user information "090-1234-5678" of the portable terminal device A210; a valid flag; and a priority "1", which is the highest priority. The personal registration data 232d also associates the following sets of data with one another: the personal ID "2"; the MAC address "0x234567890ABC" and the user information "090-2345-6789" of the portable terminal device B210; and a priority "2", which is the second highest priority. Moreover, the personal ID "3", the MAC address "0x34567890ABCD" and the user information "090-9876-5432" of the portable terminal device C210, and the priority "3", which is the lowest priority, are associated with one another.

When selecting one of the portable terminal devices A210–C210, the control unit 236 of the hands-free device 230 refers to the above personal registration data 232d, and tries to establish a communication link to the portable terminal device A210 which is indicated by the valid flag. When this is not possible, however, for such reason that the portable terminal device A210 does not exist within the communicable range, the control unit 236 specifies the portable terminal device B210 which is associated with the second-highest priority, and tries to establish a communication link to the specified portable terminal device B210. However, when the portable terminal device B210 also does not exist within the communicable range, the control unit 236 tries to establish a communication link with the portable terminal device C210 which is associated with the next highest priority.

By registering such priorities in the personal registration data 232d in advance, the hands-free device 230 can select one of a plurality of portable terminal devices 210 in accordance with the registered priorities so as to establish a communication link even when a portable terminal device 210 which is indicated by the valid flag does not exist in the communicable range of the hands-free device 230.

When priorities are registered in the personal registration data 232d in this way, a plurality of valid flags may also be registered in this personal registration data 232d. In this case, the control unit 236 of the hands-free device 230 selects, from portable terminal devices 210 indicated by the valid flags, a portable terminal device 210 to which the highest priority is assigned so as to establish a communication link with the selected portable terminal device 210.

When priorities are registered in the personal registration data 232d in the stated way, it is also possible to associate a single personal ID with a plurality of MAC addresses and user information of a plurality of portable terminal devices 210 in the personal registration data 232d. In this case, the control unit 236 of the hands-free device 230 selects a portable terminal device 210, to which the highest priority is assigned, from the plurality of portable terminal devices 210 which are associated with the same personal ID so as to establish a communication link with the selected portable terminal device 210.

In this way, the control unit 236 selects a portable terminal device 210 in accordance with priorities, personal IDs, and valid flags.

When the priorities are registered in the personal registration data 232d as described above, it is not necessary to register a personal ID in the personal registration data 232d. In this case, the control unit 236 of the hands-free device 230 selects a portable terminal device 210 that has a MAC address associated with the highest priority as a communication target device. This still allows the hands-free device 230 to specify a communication target device to establish a communication link without requiring the user to perform troublesome operations.

Third Embodiment

A hands-free communication system 200 according to a third embodiment of the present invention has the same basic construction as the hands-free communication system 200 of the second embodiment. Accordingly, elements which are common to both the hands-free communication systems 200 are given the same reference numbers and are not described below. The following only describes elements which are characteristic to the third embodiment in detail.

Figure 31:
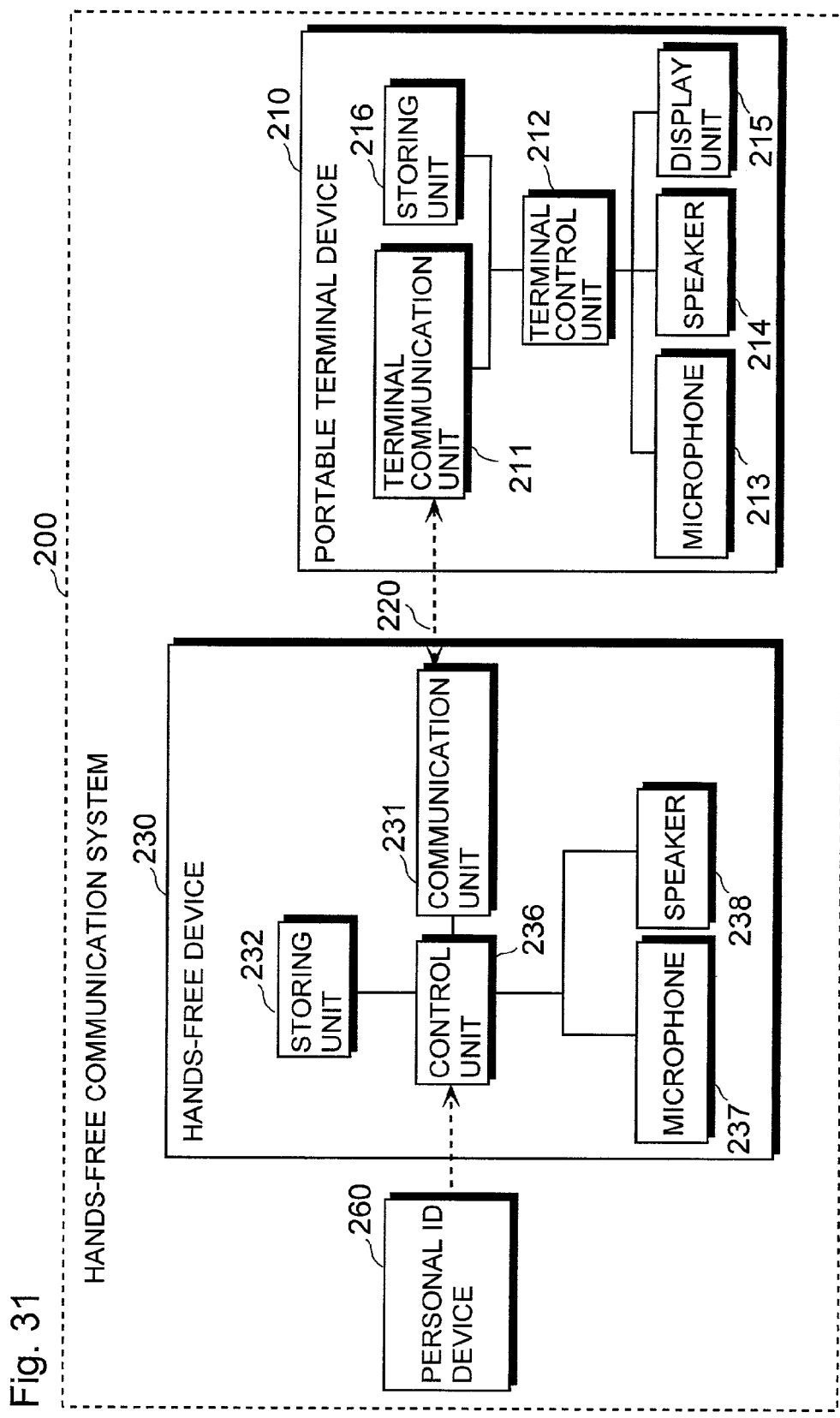
FIG. 31 is a block diagram showing a hands-free communication system of the third embodiment according to the present invention.

FIG. 31 is a block diagram showing the hands-free communication system 200 of the third embodiment.

A storing unit 232 of a hands-free device 230 of the third embodiment is achieved by a Secure Digital (SD) (a trademark of Toshiba Corporation) Memory Card, for instance, and is detachable from the hands-free device 230.

This storing unit 232 is inserted into a card reader that is internal or external to a personal computer (PC), for example. The PC writes information, which the PC generates or obtains from another device, onto the inserted storing unit 232 via the card reader. The PC also reads information from the storing unit 232, edits the read information, and writes the edited information into the storing unit 232.

That is to say, unlike the hands-free device 230 of the second embodiment, the hands-free device 230 of the present embodiment does not have the operating unit 233 and the display unit 239. The registration as shown in FIG. 15 is therefore performed by another device such as a PC.

More specifically, the user produces personal registration data 232d as shown in FIG. 25, FIG. 28, or FIG. 30 by using the PC, and inserts the storing unit 232 into the card reader of the PC to write the produced personal registration data 232d into the storing unit 232. The user then connects the storing unit 232 to the hands-free device 230.

By having a device such as a PC edit the personal registration data 232d in the storing unit 232 in this way, the operating unit 233 and the display unit 239 become unnecessary within the hands-free device 230. This downsizes the hands-free device 230 and also reduces the cost of the hands-free communication system 200.

The above-described storing unit 232 may be fixed on the hands-free device 230, although the above-described embodiment describes the storing unit 232 as detachable from the hands-free device 230. In such a case, the control unit 236 of the hands-free device 230 is connected to a PC, for instance, with a cable or wirelessly, and transfers data to/from the PC. The control unit 236 then writes the personal registration data 232d that is transferred from the PC into the storing unit 232. This hands-free device 230 also does not require the operating unit 233 and the display unit 239, and therefore downsizing of the hands-free device 230 and cost reduction of the hands-free communication system 200 can be achieved.

Fourth Embodiment

A hands-free communication system 200 according to a fourth embodiment of the present invention has the same basic construction as the hands-free communication system 200 of the third embodiment. Therefore, elements which are common to both the communication systems 200 are given the same reference numbers and are not described below. The following only describes elements which are characteristic to the fourth embodiment in detail.

Figure 32:
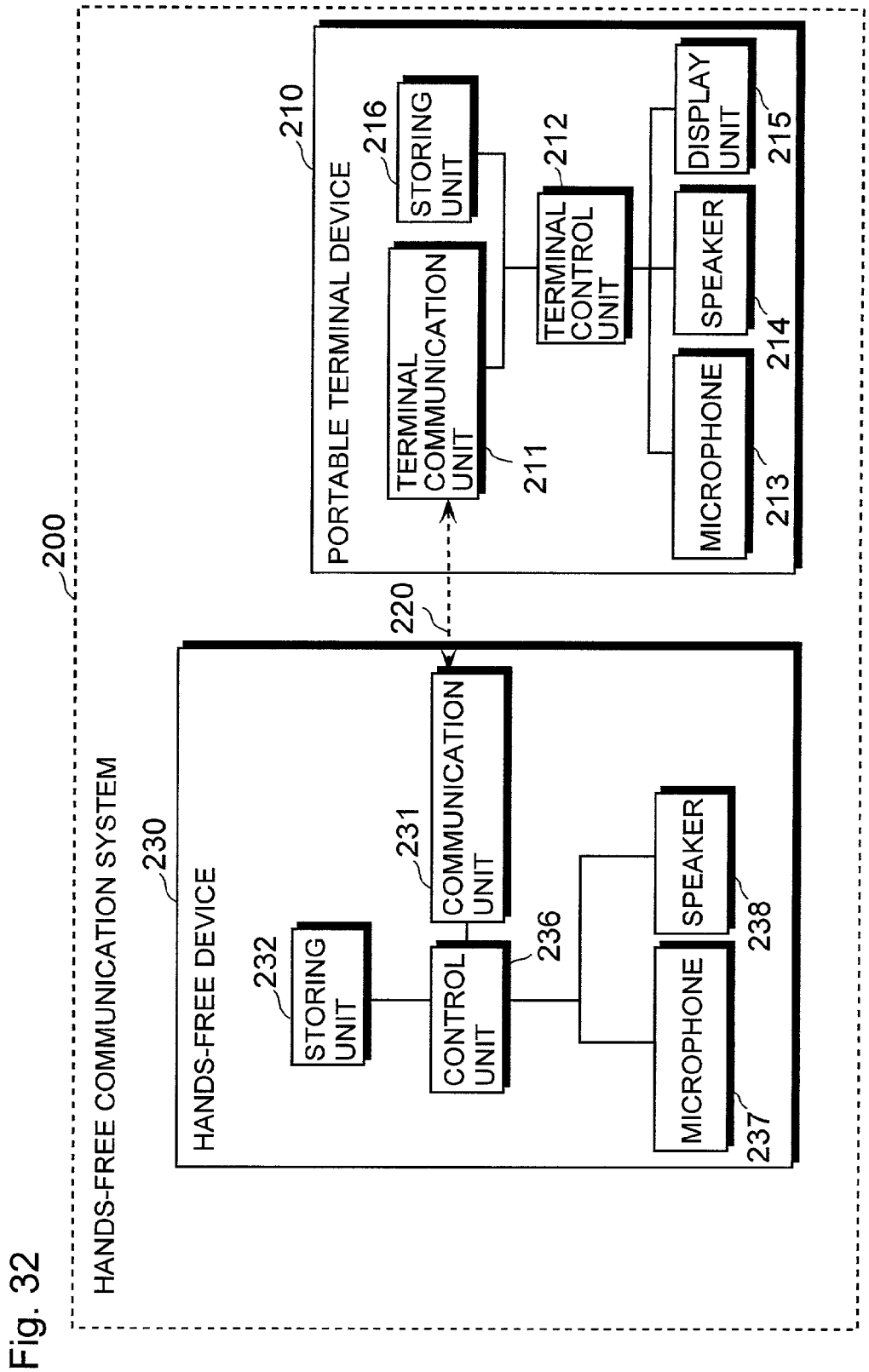
FIG. 32 is a block diagram showing a hands-free communication system of the fourth embodiment according to the present invention.

FIG. 32 is a block diagram showing the hands-free communication system 200 of the fourth embodiment.

A control unit 236 of a hands-free device 230 of the fourth embodiment receives a signal containing a MAC address and user information via a communication unit 231 from a portable terminal device 210. Based on this received signal, the control unit 236 measures an electric field intensity of a wireless signal that is sent from the portable terminal device 210, associates the measured electric field intensity with the received MAC address and user information, and places them into the storing unit 232.

When the storing unit 232 only stores one MAC address and a single set of user information, the hands-free device 230 specifies, as its communication target device, a portable terminal device 210 that has the stored MAC address and user information so as to establish a communication link. When the storing unit 232 stores a plurality of MAC addresses and a plurality sets of user information, the hands-free device 230 specifies, as its target communication device, a portable terminal device 210 that has a MAC address and user information associated with the highest electric field intensity so as to establish a communication link.

Figure 33:
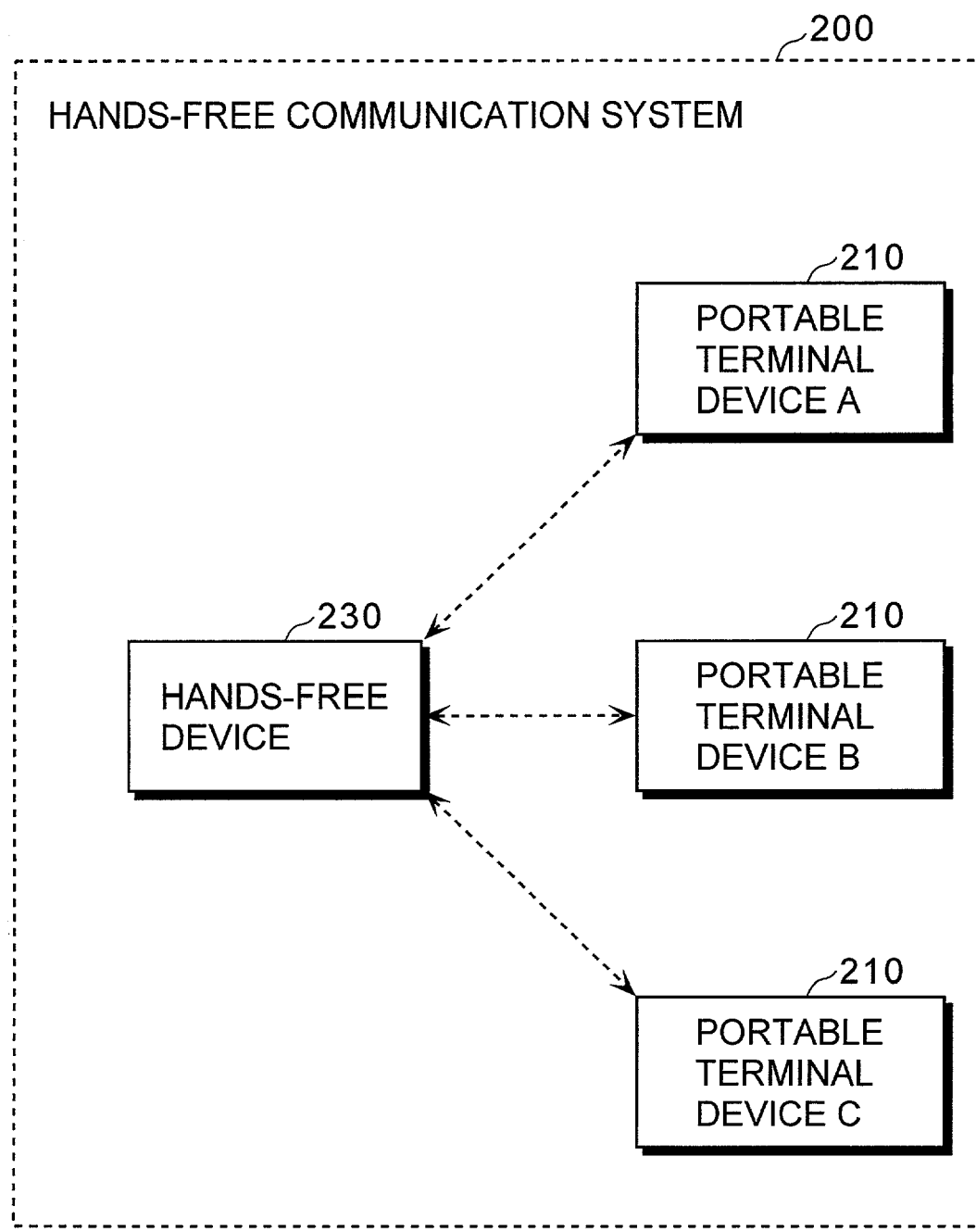
FIG. 33 shows a configuration of the hands-free communication system including three portable terminal devices within a communicable range of a hands-free device.
Figure 34:
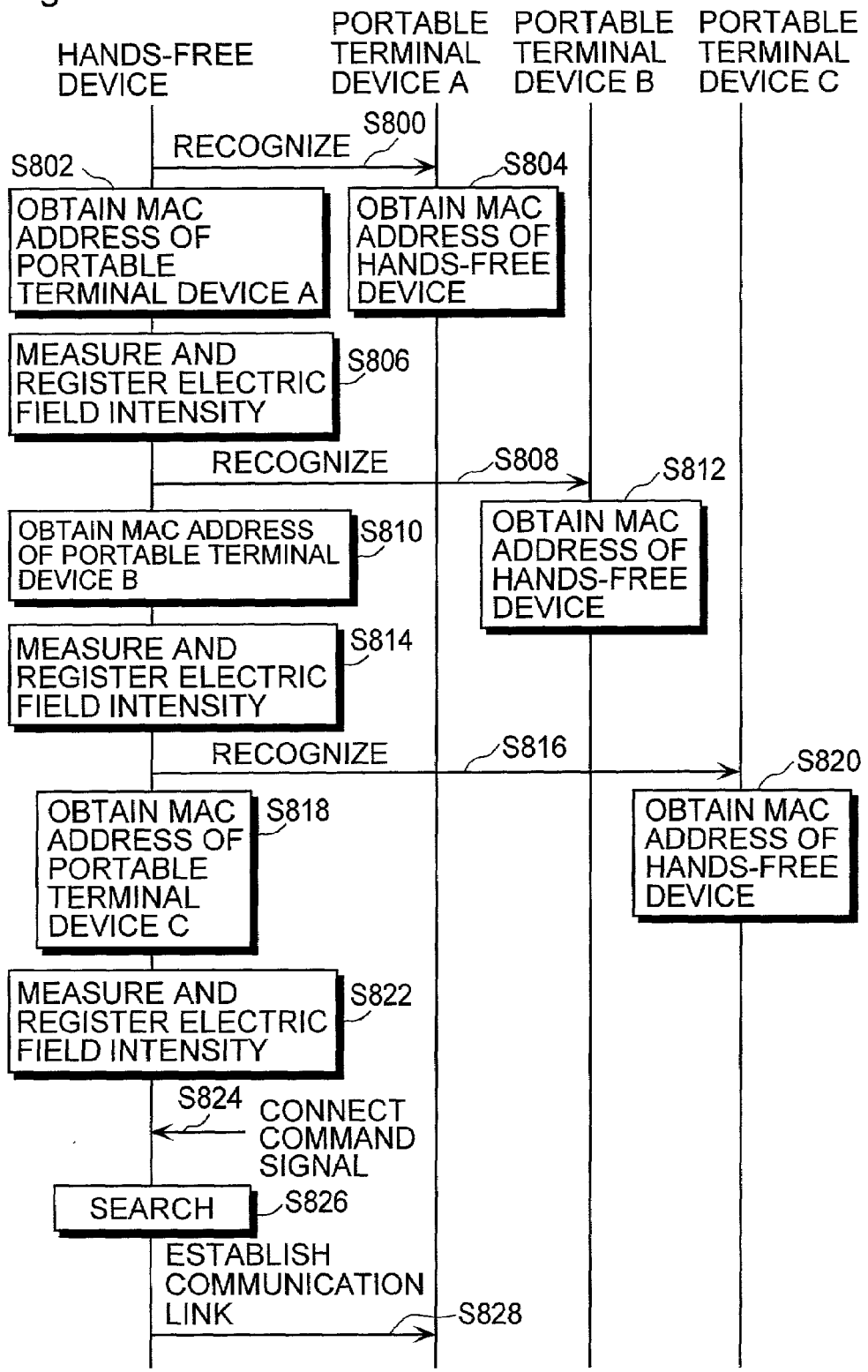
FIG. 34 is a sequence diagram showing an operation which is performed by the hands-free communication system to specify a portable terminal device.

With reference to FIGS. 33 and 34, the following describes an operation which is performed when the hands-free device 230 selects one of three portable terminal devices A210, B210, and C210 present within the communicable range of hands-free device 230, and establishes a communication link with the selected portable terminal device 210.

FIG. 33 shows a configuration of the hands-free communication system 200 including the three portable terminal devices A210–C210 within the communicable range of the hands-free device 230.

FIG. 34 is a sequence diagram showing this operation of the hands-free communication system 200.

The following description is provided on the assumption that a user A carrying the portable terminal device A210 gets into an automobile which is equipped with the hands-free device 230 and takes the driver seat, and users B and C carrying the portable terminal devices B210 and C210, respectively, get into the same automobile as passengers.

When the user A carrying the portable terminal device A210 gets into the automobile, the terminal device A210 enters the communicable range of the hands-free device 230. As a result, the control unit 236 of the hands-free device 230, which is searching for a communicable device, recognizes the portable terminal device A210 as the communicable device (step S800).

Consequently, the portable terminal device A210 sends its MAC address and user information to the hands-free device 230, and the hands-free device 230 sends its MAC address to the portable terminal device A210. In this way, the hands-free device 230 obtains the MAC address and user information of the portable terminal device A210 (step S802), while the portable terminal device A210 obtains the MAC address of the hands-free device 230 (step S804).

Following this, the control unit 236 of the hands-free device 230 measures an electric field intensity of a wireless signal from the portable terminal device A210 by referring to a signal sent from the portable terminal device A210 containing its MAC address and user information. The control unit 236 then associates the measured electric field intensity with the MAC address and user information, and places them into the storing unit 232 (step S806).

When the user B carrying the portable terminal device B210 also gets into the same automobile, the portable terminal device B210 enters the communicable range of the hands-free device 230. As a result, the control unit 236 of the hands-free device 230 searching for a communicable device recognizes the portable terminal device B210 as the communicable device (step S808).

Consequently, the hands-free device 230 sends its MAC address to the portable terminal device B210, and the portable terminal device B210 sends its MAC address and user information to the hands-free device 230. In this way, the hands-free device 230 obtains the MAC address and user information of the portable terminal device B210 (step S810), while the portable terminal device B210 obtains the MAC address of the hands-free device 230 (step S812).

Following this, the control unit 236 of the hands-free device 230 measures an electric field intensity of a wireless signal from the portable terminal device B210 by referring to a signal sent from the portable terminal device B210 containing its MAC address and user information. The control unit 236 then associates the measured electric field intensity with the MAC address and user information, and places them into the storing unit 232 (step S814).

After this, when the user C carrying the portable terminal device C210 also gets into the same automobile, the portable terminal device C210 also enters the communicable range of the hands-free device 230. As a result, the control unit 236 of the hands-free device 230 searching for a communicable device recognizes the portable terminal device C210 as a communicable device (step S816).

Consequently, the hands-free device 230 sends its MAC address to the portable terminal device C210, and the portable terminal device C210 sends its MAC address and user information to the hands-free device 230. In this way, the hands-free device 230 obtains the MAC address and user information of the portable terminal device C210 (step S818), while the portable terminal device C210 obtains the MAC address of the hands-free device 230 (step S820).

Following this, the control unit 236 of the hands-free device 230 measures an electric field intensity of a wireless signal from the portable terminal device C210 by referring to a signal sent from the portable terminal device C210 containing its MAC address and user information. The control unit 236 then associates the measured electric field intensity with the MAC address and user information, and places them into the storing unit 232 (step S822).

FIG. 35 is a table showing field intensity data 232e that is generated and stored in the storing unit 232 as described above.

In this field intensity data 232e, the MAC address "0x1234567890AB" and the user information "090-1234-5678" of the portable terminal device A210 are associated with "E1" which indicates the electric field intensity of the wireless signal of the portable terminal device A210. Further, the MAC address "0x234567890ABC" and the user information "090-2345-6789" of the portable terminal device B210 are associated with "E2" which indicates the electric field intensity of the wireless signal of the portable terminal device B210. Moreover, the MAC address "0x34567890ABCD" and the user information "090-9876-5432" of the portable terminal device C210 are associated with "E3" which indicates the electric field intensity of the wireless signal of the portable terminal device C210.

In the automobile, the user A takes the driver seat, and the users B and C take backseats. This places the portable terminal device A210 of the user A nearest to the hands-free device 230, the terminal device B210 of the user B second nearest, and the terminal device C210 farthest from the hands-free device 230.

That is to say, the three electric field intensities "E1", "E2", and "E3" in the field intensity data 232e satisfies an expression "E1>E2>E3."

Here, assume that a connect command signal to establish a communication link is inputted to the control unit 236 of the hands-free device 230 as a result of an operation by the user A (step S824). The control unit 236 then searches the field intensity data 232e for the highest field intensity (step S826).

As a result, the control unit 236 finds the highest electric field intensity "E1" in the field intensity data 232e, and reads the MAC address "0x1234567890AB" which is associated with the highest electric intensity "E1". The control unit 236 specifies, as its communication target device, the portable terminal device A210 that has the read MAC address, and establishes a Bluetooth communication link between a communication unit 231 of the hands-free device 230 and a terminal communication unit 211 of the specified portable terminal device A210 (step S828).

After the communication link is established in this way, the hands-free device 230 and the portable terminal device A210 switch to the hands-free mode and conduct the hands-free activation operation as shown in steps S730–S738 in FIG. 26.

In the hands-free communication system 200 of the fourth embodiment, it is unnecessary to register beforehand a personal ID, and a MAC address and user information of a portable terminal device 210 into the storing unit 232 of the hands-free device 230 as required in the second and third embodiments. Without such prior registration, the present hands-free device 230 can automatically specify an appropriate portable terminal device 210 as a communication target device in accordance with an electric field intensity, and establish a communication link with the specified portable terminal device 210. In addition, as the present hands-free communication system 200 does not require a personal ID device 260, cost reduction can be achieved. Moreover, the present hands-free device 230 specifies, as its communication target device, a portable terminal device 210 that sends a signal of the highest electric field intensity. Consequently, there is a high probability of the hands-free device 230 selecting a portable terminal device 210 of a driver, who is nearest to the hands-free device 230, which enables the hands-free device 230 to select the most suitable target user.

In the above-described fourth embodiment, a MAC address and user information of a portable terminal device 210 are not registered beforehand in the hands-free device 230. However, they may be registered in advance as in the second and third embodiments. In this case, the field intensity data 232e shown in FIG. 35, for instance, excludes the electric field intensities which are registered beforehand in the storing unit 232 of the hands-free device 230. In steps S806, S814, and S822 in FIG. 34, each measured electric field intensity is associated with a MAC address and user information registered beforehand, and placed into the storing unit 232.

The first to fourth embodiments have been used to describe the hands-free communication system of the present invention, although it should be clear that the present invention is not limited to these embodiments. Possible modifications are described below.

The first to fourth embodiments describe a hands-free communication system as an example of a communication system according to the present invention, although a communication system of the present invention is not limited to such a hands-free communication system.

In the first to fourth embodiments, the hands-free device 130/230 is installed in an automobile, although the hands-free device of the present invention may be installed in other places, such as a vehicle other than an automobile, and a building. The hands-free device 130/230 does not have to be fixed in one place and may be portable.

In the first to fourth embodiments, Bluetooth wireless communication is performed between the hands-free device 130/230 and the portable terminal device 110/210. However, such wireless communication is not limited to Bluetooth communication, and other wireless communication complying with other standards may be alternatively performed. Instead of a MAC address, another address that is unique to a device, such as a telephone number, may be used.

In the first to fourth embodiments, the hands-free device 130/230 first obtains a MAC address of the portable terminal device 110/210, and then the portable terminal device 110/210 obtains a MAC address of the hands-free device 130/230. It is alternatively possible, however, that the portable terminal device 110/210 first obtains a MAC address of the hands-free device 130/230.

The hands-free device 130/230 may search a device with which it can conduct Bluetooth communication only when receiving a user operation, although the first to fourth embodiments describe the hands-free device 130/230 performing this search all the time. It is alternatively possible for the portable terminal device 110/210 to perform this search and request the hands-free device 130/230 found through the search to send its MAC address. The portable terminal device 110/210 may send its MAC address and user information at the same time or different times. When Bluetooth communication is performed, it is possible to include user information in a response ("LMP_NAME_RES") to an inquiry ("LMP_NAME_REQ") about user-friendly names, which is sent from the hands-free device 130/230 to the portable terminal device 110/210.

In the first to fourth embodiments, the hands-free device 130/230 selects one of a plurality of portable terminal devices 130/230 within the communicable range. However, the hands-free device 130/230 may be connected to a plurality of portable terminal devices 110/210. This connection may be in a star topology or a bus topology.

While communicating with a portable terminal device 110/210 which has been selected out of a plurality of terminal devices 110/210, the hands-free device 130/230 may change a communication target device from the current portable terminal device 110/210 to another portable terminal device 110/210. For instance, when the portable terminal device B210 receives an emergency call while the hands-free device 230 communicates with the portable terminal device A210, the terminal device B210 makes a special request to the hands-free device 230 for establishing of a communication link to the terminal device B210. Upon receiving this request, the hands-free device 230 clears a communication link with the portable terminal device A210, and establishes a new communication link with the requesting portable terminal device B210. This can increase the ease of use of the hands-free communication system of the present invention.

It is also possible for the hands-free device 130/230 and the portable terminal device 110/210 of the first to fourth embodiments to authenticate each other before establishing a communication link. This can be performed, for instance, by providing passwords to both the hands-free device 130/230 and the portable terminal device 110/210 and having the user input the password. This authentication can prevent the hands-free device 130/230 from establishing a communication link with an unauthorized portable terminal device 110/210.

The first to fourth embodiments describe the user information as a telephone number, although the user information is not limited to a telephone number and may be a model number (such as "P504-i") or a serial number of the portable terminal device 110/210, or user-friendly text information, such as "Matsushita's Telephone Number".

In the first to fourth embodiments, the hands-free device 130/230 stores its own MAC address in the storing unit 132/232, and the portable terminal device 110/210 stores its own MAC address in the storing unit 116/216. However, the respective MAC addresses may be stored in regions other than the storing units 132/232 and 116/216, such as the communication unit 131/231 and the terminal communication unit 111/211.

The first and second embodiments describe the hands-free device 130/230 as including the microphone 137/237, the speaker 138/238, and the display unit 139/239. However, it is not necessary for the hands-free device 130/230 to include all of such units. Similarly, the portable terminal device 110/210 is described in the first and second embodiments as including the microphone 113/213, the speaker 114/214, and the display unit 115/215, although the portable terminal device 110/210 does not have to include all of these units. When the hands-free device 130/230 does not include the display unit 139/239, the control unit 136/236 of the hands-free device 130/230 may include a voice synthesizing unit that generates a guide voice (speech) for notifying the user of the user information, which is displayed by the display unit 139/239 in the above-described embodiments. The generated guide voice is outputted by the speaker 138/238.

As in the first embodiment, the connect command signal may be outputted when car doors are unlocked by the unlock signal that is sent from a transmitter of a keyless entry system, or when the engine is started, or also when the driver's taking of the seat is detected for the second and third embodiments. This allows the hands-free device 230 to specify an appropriate portable terminal device 210 and switch to the hands-free mode, without the user operating on the hands-free device 230 and noticing switching to the hands-free mode.

In the second embodiment, the control unit 236 of the hands-free device 230 measures an electric field intensity of a signal that is sent from a portable terminal device 210, but the control unit 236 does not store the measured field intensity into the storing unit 232. However, the control unit 236 may register the measured electric field intensity in the personal registration data 232$d$ in the storing unit 232 as in the fourth embodiment. This enables the control unit 236 to select an appropriate portable terminal device 210 in a more precise manner in accordance with the priority, the personal ID, the valid flag, and the electric field intensity.

What is claimed is:

1. A communication system comprising a plurality of communication devices which each communicate with another communication device from among said plurality of communication devices by obtaining an address of the other communication device, wherein a different address is assigned to each of said plurality of communication devices, and wherein one of said plurality of communications devices comprises:

a first obtaining unit operable to obtain a set of identification information assigned to each user, and a respective address of each other communication device among said plurality of communications devices from each other communication device;

a registering unit operable to associate each address obtained by said first obtaining unit with a respective identification information obtained by said first obtaining unit and with a respective priority, and to register the associated address, identification information and priority into said registering unit;

a second obtaining unit operable to obtain one of the set of identification information assigned to each user; and a specifying unit operable to
  search said registering unit for the identification information obtained by said second obtaining unit,
  specify one of said plurality of communication devices as a target communication device when the one of said plurality of communication devices has the address registered in said registering unit which is associated with the identification information obtained by said second obtaining unit and when the identification information obtained by second obtaining unit is registered in said registering unit, and
  specify another one of said plurality of communication devices as the target communication device when the another one of said plurality of communication devices has an address which is registered in said registering unit with a highest priority and when the identification information obtained by said second obtaining unit is not registered in said registering unit.

2. The communication system of claim 1, wherein
said one of said plurality of communication devices further comprises a selecting unit operable to select, in accordance with a user operation, an addresses from among the respective addresses of the each other communication device obtained by said first obtaining unit, and
said registering unit is operable to register the address selected by said selecting unit into said registering unit.

3. The communication system of claim 2, wherein
said first obtaining unit is operable to obtain user information from each other communication device among said plurality of communication devices, the user information indicating information regarding a respective user utilizing the communication device, and
said one of said plurality of communication devices further comprises a display unit operable to display the user information obtained by said first obtaining unit.

4. The communication system of claim 1, wherein
said one of said plurality of communication devices is operable to perform wireless communication with each other communication device among said plurality of communication devices, and
said first obtaining unit is operable to obtain the addresses of each other communication device among said plurality of communication devices by performing wireless communication with each other communication device.

5. The communication system claim 4, wherein
said one of said plurality of communication devices further comprises a measuring unit operable to measure an electric field intensity of a wireless signal respectively sent from each other communication device among said plurality of communication devices,
said registering unit is operable to respectively associate each obtained address with the electric field intensity of each communication device measured by said measuring unit, and to then register each electric field intensity respectively associated with the address of each other communication device into said registering unit, and
said specifying unit is operable to specify a communication device as a target communication device based on the identification information obtained by said second obtaining unit, the priority and the electric field intensity of each communication device.

6. The communication system of claim 1 with which a user performs hands-free communication, wherein
said one of said plurality of communication devices is installed in an automobile, and
each other communication device among said plurality of communication devices has a function of a portable telephone.

7. The communication system of claim 6, said specifying unit is operable to specify the target communication device as soon as an engine of the automobile is started.

8. The communication system of claim 6, wherein
a transmitter is provided to the automobile, the transmitter being operable to transmit an unlock signal to unlock a door of the automobile in response to a user operation, and
said specifying unit is operable to specify the target communication device as soon as the door of the automobile is unlocked.

9. The communication system of claim 6, wherein
the automobile includes a seating detecting unit operable to detect when a driver is seated in the automobile, and
said specifying unit is operable to specify the target communication device as soon as the driver is detected by the seating detecting unit to have been seated in the automobile.

10. The communication system of claim 6, further comprising a transmitter operable to output an unlock signal to instruct that a door of the automobile be unlocked in response to a user operation, and the identification information to identify the user,
wherein said first and the second obtaining units are operable to obtain the identification information identify the user from said transmitter, and
wherein said specifying unit is operable to specify the target communication device as soon as the door of the automobile is opened by the unlock signal.

11. The communication system of claim 6, wherein
said specifying unit is operable to search the identification information of each user registered in said registering unit for the identification information obtained by said second obtaining unit, to associate a respective flag with each identification information and to register, in said registering unit, a flag indicating the identification information obtained by said second obtaining unit as being valid, and
said specifying unit is operable to specify a target communication device having the address which is respectively associated with the flag through the identification information.

12. The communication system of claim 6, further comprising a transmitter operable to output an unlock signal to instruct that a door of the automobile be unlocked in response to a user operation, and the identification information to identify the user,
wherein said first and the second obtaining units are operable to obtain the identification information identify the user from said transmitter, and
wherein said specifying unit is operable to search the identification information registered in said registering unit for the identification information obtained by said second obtaining unit when the door of the automobile is opened by the unlock signal, to register in said registering unit, in advance, a flag indicating the identification information obtained by said second obtaining unit as being valid by associating the flag with the identification information, and to specify a communication device with the address associated with the flag as a target communication device when said specifying unit receives a connection instructing signal.

13. The communication system of claim 12, wherein said specifying unit is operable to delete the flag registered in said registering unit after a predetermined time elapses from when the flag was registered.

14. A communication device operable to communicate with a communication apparatus from among a plurality of communication apparatuses by obtaining an address of the communication apparatus, said communication device comprising:
a first obtaining unit operable to obtain a set of identification information assigned to each user, and a respective address of each communication apparatus from each of the plurality of communication apparatuses;
a registering unit operable to associate each address obtained by said first obtaining unit with a respective identification information obtained by said first obtaining unit and with a respective priority, and to register the associated address, identification information and priority into said registering unit;

a second obtaining unit operable to obtain one of the set of identification information assigned to each user; and a specifying unit operable to
search said registering unit for the identification information obtained by said second obtaining unit,
specify one of the plurality of communication apparatuses as a target communication apparatus when the one of the plurality of communication apparatuses has the address registered in said registering unit which is associated with the identification information obtained by said second obtaining unit and when the identification information obtained by second obtaining unit is registered in said registering unit, and
specify another one of the plurality of communication apparatuses as the target communication device when the another one of the plurality of communication apparatuses has an address which is registered in said registering unit with a highest priority and when the identification information obtained by said second obtaining unit is not registered in said registering unit.

15. A communication method used for a communication device included in a communication system, which comprises a plurality of communication devices which each communicate with another communication device from among the plurality of communication devices by obtaining an address of the other communication device, wherein a different address is assigned to each of the plurality of communication devices, and wherein said communication method comprises:

a first obtaining operation of obtaining a set of identification information assigned to each user, and a respective address of each other communication device among the plurality of communications devices from each other communication device;

a registering operation of associating each address obtained by said first obtaining operation with a respective identification information obtained by said first obtaining operation and with a respective priority, and registering the associated address, identification information and priority into a storing unit;

a second obtaining operation of obtaining one of the set of identification information assigned to each user; and a specifying operation of
searching the storing unit for the identification information obtained by said second obtaining operation,
specifying one of the plurality of communication devices as a target communication device when the one of the plurality of communication devices has the address registered in the storing unit which is associated with the identification information obtained by said second obtaining operation and when the identification information obtained by second obtaining operation is registered in the storing unit, and
specifying another one of the plurality of communication devices as the target communication device when the another one of the plurality of communication devices has an address which is registered in the storing unit with a highest priority and when the identification information obtained by said second obtaining operation is not registered in the storing unit.

16. A program for a communication device included in a communication system, which comprises a plurality of communication devices which each communicate with another communication device from among the plurality of communication devices by obtaining an address of the other communication device, wherein a different address is assigned to each of the plurality of communication devices, and wherein said communication method comprises:

a first obtaining operation of obtaining a set of identification information assigned to each user, and a respective address of each other communication device among the plurality of communications devices from each other communication device;

a registering operation of associating each address obtained by said first obtaining operation with a respective identification information obtained by said first obtaining operation and with a respective priority, and registering the associated address, identification information and priority into a storing unit;

a second obtaining operation of obtaining one of the set of identification information assigned to each user; and a specifying operation of
searching the storing unit for the identification information obtained by said second obtaining operation,
specifying one of the plurality of communication devices as a target communication device when the one of the plurality of communication devices has the address registered in the storing unit which is associated with the identification information obtained by said second obtaining operation and when the identification information obtained by second obtaining operation is registered in the storing unit, and
specifying another one of the plurality of communication devices as the target communication device when the another one of the plurality of communication devices has an address which is registered in the storing unit with a highest priority and when the identification information obtained by said second obtaining operation is not registered in the storing unit.

* * * * *